US010376950B2

(12) United States Patent
Takamura et al.

(10) Patent No.: US 10,376,950 B2
(45) Date of Patent: Aug. 13, 2019

(54) BLADE, GAS TURBINE INCLUDING THE SAME, AND BLADE MANUFACTURING METHOD

(71) Applicant: Mitsubishi Hitachi Power Systems, Ltd., Yokohama-shi, Kanagawa (JP)

(72) Inventors: Keita Takamura, Yokohama (JP); Satoshi Hada, Yokohama (JP); Hidekatsu Atsumi, Yokohama (JP); Tomofumi Shintani, Yokohama (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 52 days.

(21) Appl. No.: 15/743,909

(22) PCT Filed: Sep. 8, 2016

(86) PCT No.: PCT/JP2016/076496
§ 371 (c)(1),
(2) Date: Jan. 11, 2018

(87) PCT Pub. No.: WO2017/047502
PCT Pub. Date: Mar. 23, 2017

(65) Prior Publication Data
US 2018/0200783 A1 Jul. 19, 2018

(30) Foreign Application Priority Data
Sep. 15, 2015 (JP) .................................. 2015-181691

(51) Int. Cl.
*B22C 9/04* (2006.01)
*B22C 9/10* (2006.01)
(Continued)

(52) U.S. Cl.
CPC ................ *B22C 9/043* (2013.01); *B22C 9/04* (2013.01); *B22C 9/10* (2013.01); *B22D 25/02* (2013.01);
(Continued)

(58) Field of Classification Search
CPC .... F01D 5/18; F01D 5/187; F02C 7/00; F02C 7/18; B22C 9/04; B22C 9/043;
(Continued)

(56) References Cited

U.S. PATENT DOCUMENTS 5,340,278 A 8/1994 Magowan
7,131,817 B2 * 11/2006 Keith ..................... F01D 5/081
416/97 R
(Continued)

FOREIGN PATENT DOCUMENTS

CH 703 894 3/2012
DE 10 2013 109 146 3/2014
(Continued)

OTHER PUBLICATIONS

International Search Report dated Nov. 22, 2016 in International (PCT) Application No. PCT/JP2016/076496, with English translation.
(Continued)

*Primary Examiner* — Igor Kershteyn
(74) *Attorney, Agent, or Firm* — Wenderoth, Lind & Ponack, L.L.P.

(57) ABSTRACT

A blade has a blade, passage extending in a blade height direction, a platform passage formed inside a platform, and a communication passage leading from an outer surface of a shaft-mounted part through the platform passage to the blade passage. An inner surface defining an inflow passage portion of the platform passage includes a shaft-side inner surface that faces a gas path side. The shaft-side inner
(Continued)

surface spreads in a direction having more of a component of a blade thickness direction than a component of the blade height direction. An inner surface defining the communication passage joins to the shaft-side inner surface.

16 Claims, 14 Drawing Sheets

(51) Int. Cl.
| | |
|---|---|
| *B22D 25/02* | (2006.01) |
| *B22D 29/04* | (2006.01) |
| *B23H 9/10* | (2006.01) |
| *B23H 9/14* | (2006.01) |
| *F01D 5/18* | (2006.01) |
| *F02C 7/18* | (2006.01) |
| *B22D 29/00* | (2006.01) |
| *F02C 7/00* | (2006.01) |

(52) U.S. Cl.
CPC ............ *B22D 29/00* (2013.01); *B22D 29/04* (2013.01); *B23H 9/10* (2013.01); *B23H 9/14* (2013.01); *F01D 5/18* (2013.01); *F01D 5/187* (2013.01); *F02C 7/00* (2013.01); *F02C 7/18* (2013.01); *F05D 2230/21* (2013.01); *F05D 2240/81* (2013.01)

(58) Field of Classification Search
CPC .......... B22C 9/10; B22D 25/02; B22D 29/00; B22D 29/04; B23H 9/10; B23H 9/14; F05D 2230/21; F05D 2240/81
See application file for complete search history.

(56) References Cited

U.S. PATENT DOCUMENTS

| | | | | |
|---|---|---|---|---|
| 7,416,391 B2* | 8/2008 | Veltre | .................... | F01D 5/187 416/193 A |
| 7,927,073 B2* | 4/2011 | Scott | .................... | F01D 5/187 416/193 A |
| 8,096,767 B1* | 1/2012 | Liang | .................... | F01D 5/187 415/115 |
| 8,356,978 B2* | 1/2013 | Beattie | .................... | F01D 5/18 416/193 A |
| 8,444,381 B2* | 5/2013 | Seely | .................... | F01D 5/082 415/1 |
| 8,794,921 B2* | 8/2014 | Ellis | .................... | F01D 5/087 29/525 |
| 2005/0100437 A1 | 5/2005 | Phillips et al. | | |
| 2006/0024166 A1 | 2/2006 | Whitton | | |
| 2006/0269409 A1* | 11/2006 | Torii | .................... | F01D 5/187 416/97 R |
| 2007/0077144 A1 | 4/2007 | Lee et al. | | |
| 2007/0181278 A1 | 8/2007 | Bancheri et al. | | |
| 2009/0202339 A1 | 8/2009 | Torii et al. | | |
| 2012/0082564 A1 | 4/2012 | Ellis et al. | | |
| 2012/0107134 A1 | 5/2012 | Harris, Jr. et al. | | |
| 2012/0156055 A1 | 6/2012 | Harris, Jr. et al. | | |
| 2013/0171005 A1 | 7/2013 | Ellis et al. | | |
| 2014/0064984 A1 | 3/2014 | Zhang et al. | | |
| 2016/0032736 A1 | 2/2016 | Healy et al. | | |
| 2017/0145832 A1* | 5/2017 | Mongillo | ................ | B23P 15/04 |
| 2018/0094527 A1* | 4/2018 | Halfmann | ............... | F01D 5/187 |

FOREIGN PATENT DOCUMENTS

| | | |
|---|---|---|
| EP | 2 543 821 | 1/2013 |
| EP | 2 915 954 | 9/2015 |
| JP | 8-505195 | 6/1996 |
| JP | 2007-100698 | 4/2007 |
| JP | 2007-210032 | 8/2007 |
| JP | 2008-202547 | 9/2008 |
| JP | 2012-97740 | 5/2012 |
| JP | 2012-132438 | 7/2012 |
| JP | 2013-139772 | 7/2013 |
| JP | 2014-223620 | 12/2014 |
| JP | 2015-123497 | 7/2015 |
| WO | 2011/108440 | 9/2011 |

OTHER PUBLICATIONS

Written Opinion of the International Searching Authority dated Nov. 22, 2016 in International (PCT) Application No. PCT/JP2016/076496, with English translation.

* cited by examiner

BLADE, GAS TURBINE INCLUDING THE SAME, AND BLADE MANUFACTURING METHOD

TECHNICAL FIELD

The present invention relates to a blade, a gas turbine including this blade, and a blade manufacturing method.

The present application claims priority based on Japanese Patent Application No. 2015-181691 filed on Sep. 15, 2015, the contents of which are incorporated herein by reference.

BACKGROUND ART

A gas turbine includes a rotor that rotates around an axis and a casing that covers this rotor. The rotor has a rotor shaft and a plurality of blades mounted on this rotor shaft. The blade has a blade body that forms an airfoil, a platform that spreads from an end in a blade height direction of the blade both in a direction roughly perpendicular to the blade height direction, and a shaft-mounted part that extends from the platform toward the opposite side from the blade body.

The blades of a gas turbine are exposed tea high-temperature combustion gas. Therefore, the blades are commonly cooled with air etc.

For example, the blade described in Patent Literature 1 below has various cooling passages through which cooling air passes. Specifically, blade passages through which cooling air flows are formed inside the blade body, the platform, and the shaft-mounted part so as to extend in a blade height direction. The platform has a gas path surface that faces the blade height direction and comes in contact with combustion gas, and a shaft-side surface that is located back-to-back with the gas path surface. This platform further has a platform passage which extends between the gas path surface and the shaft-side surface in a blade thickness direction and through which cooling air flows, and a turndown extension portion that extends from an end of the platform passage on the blade passage side in a direction away from the gas path surface. A communication passage that leads from an outer surface at a corner between the shaft-side surface of the platform and an outer surface of the shaft-mounted part through the turndown extension portion to the blade passage is formed inside the platform and the shaft-mounted part. An opening of this communication passage in the outer surface at the corner is blocked with a plug etc.

This blade is basically manufactured by casting. The blade passage, the platform passage, and the turndown extension portion are formed by a casting process using cores that have external shapes matching their respective shapes. In an intermediate product of the blade formed by casting, the platform passage and the turndown extension portion communicate with each other, while the turndown extension portion and the blade passage do not communicate with each other. The communication passage is formed after this intermediate product is formed. Specifically, a through-hole that extends from the outer surface at the corner of the intermediate product through the turndown extension portion to the blade passage is formed by machining. This through-hole, i.e., the communication passage, bisects the turndown extension portion into a part on the gas path surface side and a part on the shaft-side surface side.

CITATION LIST

Patent Literature

Patent Literature 1 Japanese Patent Laid-Open No. 2012-132438

SUMMARY OF INVENTION

Technical Problem

In the blade described in Patent Literature 1, cooling air flows from the blade passage into the turndown extension portion and the platform passage through the communication passage. In this blade, the component of velocity of the cooling air in the blade thickness direction decreases in the process of the cooling air flowing through the turndown extension portion, so that the effect of convective cooling by the cooling air flowing through the turndown extension portion decreases accordingly. Thus, one problem with this blade is that the cooling effect on the gas path surface near the blade body is reduced. Another problem with this blade is that the strength of the blade is reduced by the formation of the turndown extension portion, in addition to the platform passage, inside the platform.

An object of the present invention is therefore to provide a blade that can avoid the reduction of the strength and the cooling effect, a gas turbine including this blade, and a blade manufacturing method.

Solution to Problem

A blade as an aspect according to the present invention to achieve the above object is a blade including:

a blade body that forms an airfoil and is disposed inside a combustion gas flow passage through which combustion gay flows;

a platform that spreads from an end in a blade height direction of the blade body in a direction having a component perpendicular to the blade height direction; and a shaft-mounted part that extends from the platform toward the opposite side from the blade body, wherein a blade passage through which cooling air flows is formed inside the blade body, the platform, and the shaft-mounted part so as to extend through the blade body, the platform, and the shaft-mounted part in the blade height direction, the platform has a gas path surface that faces the blade height direction and comes in contact with the combustion gas, a shaft-side surface that is located back-to-back with the gas path surface, and a platform passage which is formed between the gas path, surface and the shaft-side surface and through which cooling air flows, the blade has a communication passage that leads from at least one surface of the shaft-side surface of the platform and an outer surface of the shaft-mounted part through the platform passage to the blade passage, an opening of the communication passage in the at least one surface is blocked with a sealing member, the platform passage has an inflow passage portion that extends from a position near the blade passage in a direction having a component of a blade thickness direction based on that position, an inner surface defining the inflow passage portion includes a gas path-side inner surface that faces the shaft-side surface side, and a shaft-side inner surface that is the only surface of the inner surface facing the gas path-side inner surf ace and spreads in a direction having more of a component of the blade thickness direction than a component of the blade height, direction, and an inner surface defining the communication passage intersects with and joins to the shaft-side inner surface of the inflow passage portion.

In this blade, the inner surface of the communication passage intersects with and joins to the shaft-side inner surface that is a part of the inner surface of the inflow passage portion of the platform passage. This makes it possible to provide communication between the blade passage and the platform passage without forming the turndown extension portion as in the blade described in the section of Background Art. Therefore, this blade does not have the turndown extension portion. Thus, this blade can avoid the reduction of the blade strength resulting from the formation of the turndown extension portion.

Since the turndown extension portion is not formed in this blade, compared with the blade described in the section of Background Art, a linear route toward the platform passage is formed as a route of cooling air leading from the blade passage to the platform passage. Thus, this blade can reduce the pressure loss of the cooling air occurring in the process of the cooling air flowing from the blade passage into the platform passage. Moreover, since the turndown extension portion is not formed in this blade, the component of velocity in the blade thickness direction in which the inflow passage portion of the platform passage extends is virtually unlikely to decrease in the process of the cooling air flowing from the communication passage into the inflow passage portion. Thus, this blade can avoid the reduction of the cooling effect on the gas path surface near the blade body.

In the above blade, the inner surface of the inflow passage portion may include an end inner surface that spreads from an end of the shaft-side inner surface on the blade passage side in a direction having a component of the blade height direction and joins to an end of the gas path-side inner surface on the blade passage side; and the inner surface of the communication passage may intersect with and join to the end inner surface of the inflow passage portion.

In this blade, the communication passage joins not only to the shaft-side inner surface of the inflow passage portion but also to the end inner surface facing the inner surface of the blade passage, so that a more linear route toward the platform passage is formed as a route of cooling air leading from the blade passage to the platform passage. Thus, this blade can further reduce the pressure loss of the cooling air, as well as further avoid the reduction of the cooling effect on the gas path surface near the blade body.

In any one of the above blades, the inner surface of the communication passage may intersect with and join to the gas path-side inner surface of the inflow passage portion.

In any one of the above blades, a bulge bulging in the blade thickness direction toward the inflow passage portion may be formed in the blade passage, and the communication passage may intersect with and join to the bulge of the blade passage.

In this blade, the bulge is formed in the blade passage, which can shorten the distance between the blade passage and the inflow passage portion in the blade thickness direction. Thus, this blade can further reduce the pressure loss of the cooling air occurring in the process of the cooling air flowing from the blade passage into the platform passage.

In any one of the above blades, the platform passage may have a meander passage portion that meanders inside the platform.

Since this blade has the meander passage portion, a wide area of the inside of the platform can be cooled with cooling air flowing into the platform passage.

In any one of the above blades, the platform may have a lateral end surface that spreads in a direction having a component perpendicular to a width direction and joins to the gas path surface, the width direction having a component perpendicular to a chord direction of the blade body and the blade height direction; and the platform passage may have a lateral end passage portion that extends along the lateral end surface in a direction having a component of the chord direction.

According to this blade, a part of the platform near the lateral end surface can be cooled.

A gas turbine as another aspect of the present invention to achieve the above object is a gas turbine including: a plurality of any one of the above blades; a rotor shaft on which the plurality of blades are mounted; a casing that covers the plurality of blades and the rotor shaft; and a combustor that sends combustion gas to a region inside the casing where the plurality of blades are disposed.

A blade manufacturing method according to yet another aspect according to the present invention to achieve the above object is a blade manufacturing method including:

an intermediate product forming step of forming an intermediate product of a blade having a blade body that forms an airfoil and is disposed inside a combustion gas flow passage through which combustion gas flows, a platform that spreads from an end in a blade height direction of the blade body in a direction having a component perpendicular to the blade height direction, and a shaft-mounted part that extends from the platform toward the opposite side from the blade body;

a communication passage forming step of forming a communication passage that extends from an outer surface of the intermediate product to an inside of the intermediate product; and a sealing step of blocking an opening of the communication passage in the outer surface of the intermediate product, wherein in the intermediate product forming step, a blade passage through which cooling air flows is formed inside the blade body, the platform, and the shaft-mounted part so as to extend in the blade height direction;

a gas path surface that faces the blade height direction and comes in contact with the combustion gas, a shaft-side surface that is located back-to-back with the gas path surface, and a platform passage which is formed between the gas path surface and the shaft-side surface and through which cooling air flows are formed in the platform;

an inflow passage portion that extends from, a position near the blade passage in a direction having a component of a blade thickness direction based on that position is formed as a part of the platform passage; and as a part of an inner surface defining the inflow passage portion, a gas path-side inner surface that faces the shall-side surface side, and a shaft-side inner surface that is the only surface of the inner surface facing the gas path-side inner surface and spreads in a direction having more of a component of the blade thickness direction than a component of the blade height direction, are formed when the inflow passage portion is formed, and in the communication passage forming step, a through-hole that extends from at least one surface of the shaft-side surface of the platform and an outer surface of the shaft-mounted part through the shaft-side inner surface of the inflow passage portion to the blade passage is formed as the communication passage.

In this manufacturing method, a through-hole that extends to the blade passage through the shaft-side inner surface that is a part of the inner surface of the inflow passage portion of the platform passage is formed as the communication passage. Thus, according to this manufacturing method, it is possible to provide communication between the blade passage and the platform passage without forming the turndown extension portion as in the blade described in the, section of Background Art. Therefore, the blade manufactured by this manufacturing method does not have the turndown extension portion. Thus, this blade can avoid the reduction of the blade strength resulting from the formation of the turndown extension portion.

Since the turndown extension portion is not formed in the blade formed by this manufacturing method, compared with the blade described in the section of Background Art, a linear route toward the platform passage is formed as a route of cooling air leading from the blade passage to the platform passage. Thus, the blade formed by this manufacturing method can reduce the pressure loss of the cooling air occurring in the process of the cooling air flowing from the blade passage into the platform passage. Moreover, since the turndown extension portion is not formed in the blade formed by this manufacturing method, the component of velocity in the blade thickness direction in which the inflow passage portion of the platform passage extends is virtually unlikely to decrease in the process of the cooling air flowing from the communication passage into the inflow passage portion. Thus, the blade formed by this manufacturing method can avoid the reduction of the cooling effect on the gas path surface near the blade body.

In the above manufacturing method, in the intermediate product forming step, an end inner surface that spreads from an end of the shaft-side inner surface on the blade passage side in a direction having a component of the blade height direction and joins to an end of the gas path-side inner surface on the blade passage side may be formed as a part of the inner surface defining the inflow passage portion; and in the communication passage forming stop, a through-hole that extends to the blade passage through the end inner surface of the inflow passage portion may be formed as the communication passage.

In any one of the above manufacturing methods, in the communication passage forming step, a through-hole that extends to the blade passage through a corner between the shaft-side inner surface and the end inner surface of the inflow passage portion may be formed as the communication passage.

In any one of the above manufacturing methods, in the communication passage forming step, a through-hole that extends to the blade passage through the gas path-side inner surface of the inflow passage portion may be formed as the communication passage.

In any one of the above manufacturing methods, in the communication passage forming step, a through-hole that extends to the blade passage through a corner between the gas path-side inner surface and the end inner surface of the inflow passage portion may be formed as the communication passage.

In any one of the above manufacturing methods, the intermediate product forming step may include: a casting mold forming step of forming a casting mold that has an internal space matching the external shape of the blade; a core forming step of forming a blade passage core that has an external shape matching the shape of the blade passage, and a platform passage core that has an external shape matching the shape of the platform passage; a casting step of disposing the blade passage core and the platform passage core inside the casting mold, and pouring molten metal into the casting mold; and a core melting step of melting the blade passage core and the platform passage core after the molten metal has hardened.

In any one of the above manufacturing methods, in the intermediate product forming step, a pilot hole may be termed that is recessed from at least one surface of the shaft-side surface of the platform and an outer surface of the shaft-mounted part toward the shaft-side inner surface of the inflow passage portion; and in the communication passage forming step, a through-hole may be formed that extends from a bottom surface of the pilot hole of the intermediate product, formed in the intermediate product forming step, through the shaft-side inner surface of the inflow passage portion to the blade, passage.

According to this manufacturing method, the amount of machining performed on the intermediate product to form the through-hole can be reduced in the communication passage forming step. Moreover, according to this manufacturing method, the pilot hole formed in the intermediate product forming step can be used as a guide to form the through-hole, which can enhance the accuracy of the extension direction of the communication passage.

In the manufacturing method in which the pilot hole is formed in the intermediate product forming step, in the core forming step, a pilot hole core that has an external shape matching the shape of the pilot hole may be formed; in the casting step, the pilot hole core may be disposed inside the casting mold, and molten metal may be poured into the casting mold; and in the core melting step, the pilot hole core may be melted after the molten metal has hardened.

In any one of the above manufacturing methods, in the communication passage forming step, the through-hole may be formed by electric discharge machining or electro-chemical machining.

Advantageous Effects of Invention

According to an aspect of the present invention, it is possible to avoid the reduction of the strength and the cooling effect of a blade.

DESCRIPTION OF EMBODIMENTS

In the following, an embodiment and various modified examples of the present invention will he described in detail with reference to the drawings.

Embodiment

Figure 1:
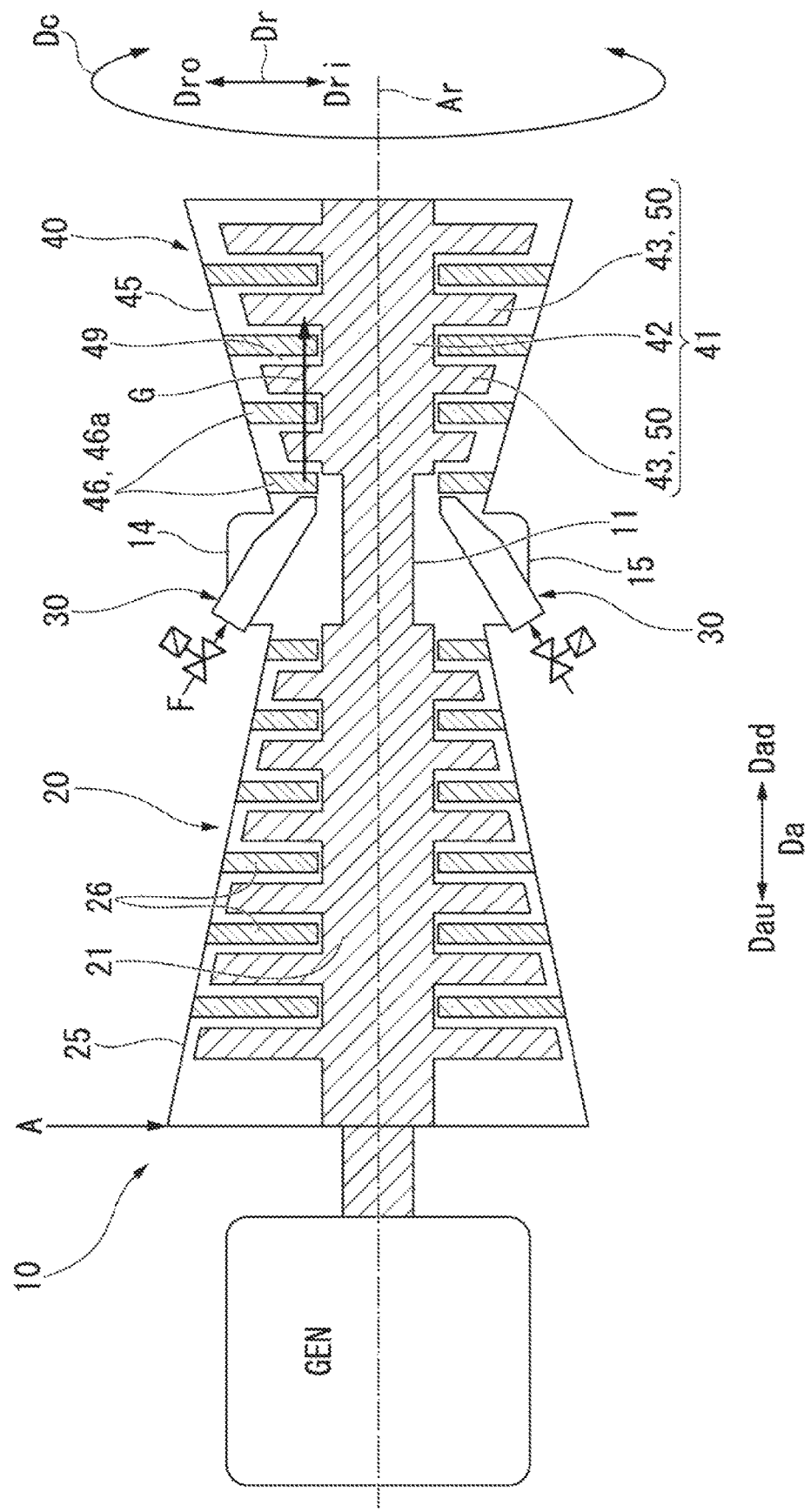
FIG. 1 is a schematic sectional view of a gas turbine according to an embodiment of the present invention.

As shown in FIG. 1, a gas turbine 10 as an embodiment according to the present invention includes a compressor 20 that compresses air A, combustors 30 that generate combustion gas G by combusting fuel F in the air A compressed by the compressor 20, and a turbine 40 that is driven by the combustion gas G.

The compressor 20 has a compressor rotor 21 that rotates around an axis Ar, a compressor casing 25 that covers the compressor rotor 21, and a plurality of vane rows 26. The turbine 40 has a turbine rotor 41 that rotates around the axis Ar, a turbine casing 45 that covers the turbine rotor 41, and a plurality of vane rows 46.

The compressor rotor 21 and the turbine rotor 41 are located on the same axis Ar and connected to each other to form a gas turbine rotor 11. For example, a rotor of a generator GEN is connected to the gas turbine rotor 11. The gas turbine 10 further includes an intermediate casing 14 that is disposed between the compressor casing 25 and the turbine casing 45. The combustors 30 are mounted On the intermediate casing 14. The compressor casing 25, the intermediate casing 14, and the turbine casing 45 are connected to one another to form a gas turbine casing 15. Hereinafter, a direction in which the axis Ar extends will be referred to as an axial direction Da. A circumferential direction around the axis Ar will be referred to simply as a circumferential direction Dc, and a direction perpendicular to the axis Ar will be referred to as a radial direction Dr. In the axial direction Da, the side of the compressor 20 relative to the turbine 40 and the opposite side will be respectively referred to as an upstream side Dau and a downstream side Dad. In the radial direction Dr, the side closer to the axis Ar and the opposite side will be respectively referred to as a radially inner side Dri and a radially outer side Dro.

The turbine rotor 41 has a rotor shaft 42 that extends in the axial direction Da around the axis Ar, and a plurality of blade rows 43 that are mounted on the rotor shaft 42. The plurality of blade rows 43 are arrayed in the axial direction Da. Each blade row 43 is composed of a plurality of blades 50 that are arrayed in the circumferential direction Dc. One vane row 46 is disposed on the upstream side Dau of each of the plurality of blade rows 43. The vane rows 46 are provided on an inner side of the turbine casing 45. Each vane row 46 is composed of a plurality of vanes 46a that are arrayed in the circumferential direction Dc.

An annular space which is defined between an outer circumferential side of the rotor shaft 42 and an inner circumferential side of the turbine casing 45 and in which the vanes 46a and the blades 50 are disposed in the axial direction Da forms a combustion gas flow passage 49 through which the combustion gas Ci from the combustors 30 flows. The combustion gas flow passage 49 forms an annular shape around the axis Ar and is long in the axial direction Da.

Figure 2:
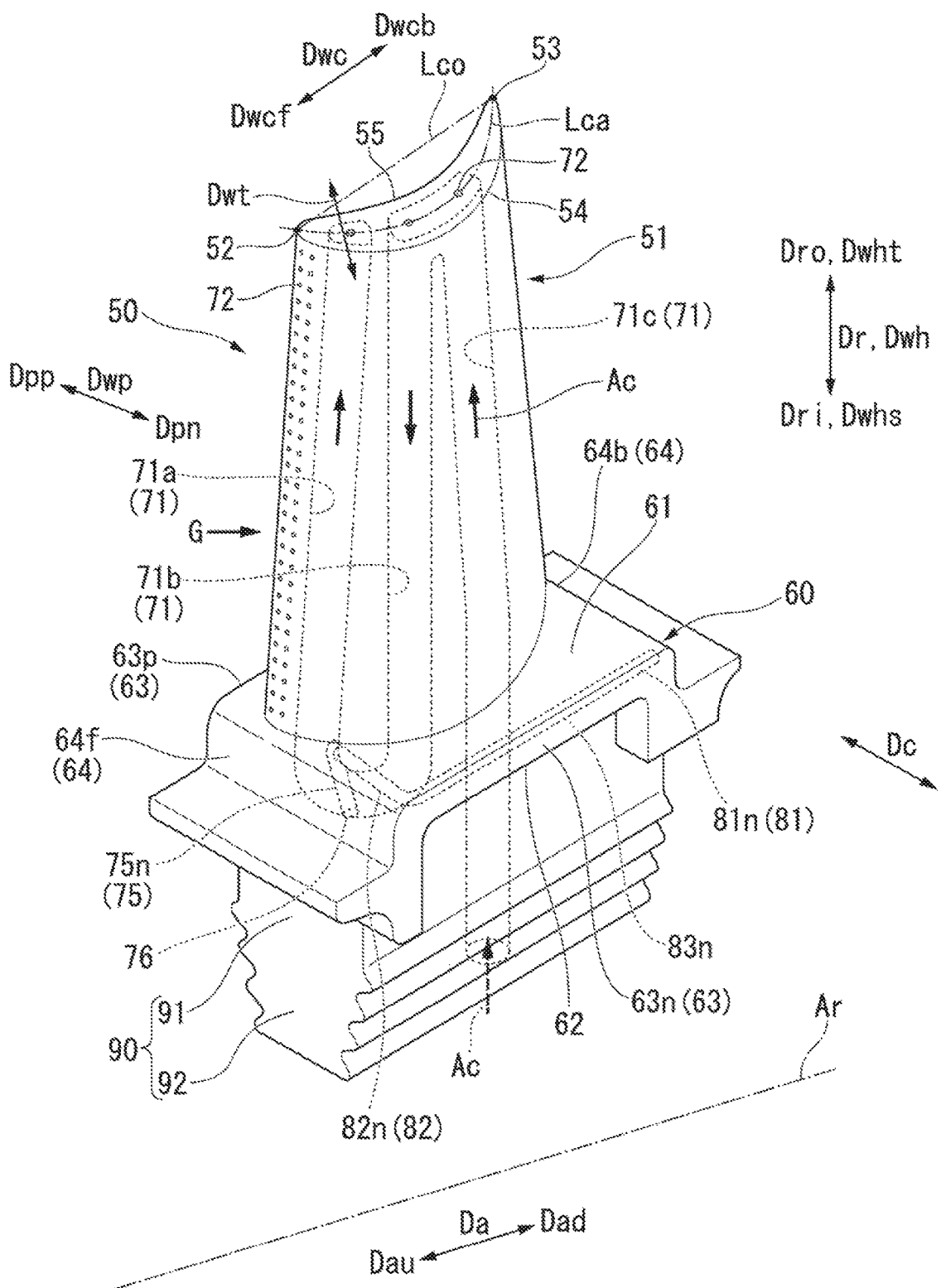
FIG. 2 is a perspective view of a blade according to the embodiment of the present invention.

As shown in FIG. 2, the blade 50 has a blade body 51 that forms an airfoil, a platform 60 that is provided at an end of the blade body 51 in a blade height direction Dwh, and a shaft-mounted part 90 that extends from the platform 60 toward the opposite side from the blade body 51. Hereinafter, in the blade height direction Dwh and relative to the platform 60, the side on which the blade body 51 is present and the side on which the blade-mounted part 90 is present will be respectively referred to as a leading end side Dwht and a base end side Dwhs, In a state where the blade 50 is mounted on the rotor shaft 42, the blade height direction Dwh is substantially the same direction as the radial direction Dr. Accordingly, in this state, the leading end side Dwht coincides with the radially outer side Dro and the base end side Dwhs coincides with the radially inner side Dri. Moreover, in this state, relative to the platform 60, the blade body 51 is present on the radially outer side Dro and the blade-mounted part 90 is present on the radially inner side Dri.

The blade body 51 is disposed inside the combustion gas flow passage 49. The blade body 51 has a suction-side surface (negative pressure surface) 54 that is a convex surface, and a pressure-side surface (positive pressure surface) 55 that is a concave surface. The suction-side surface 54 and the pressure-side surface 55 join to each other at a leading edge 52 and a trailing edge 53 of the blade body 51. In the state where the blade 50 is mounted on the rotor shaft 42, the leading edge 52 is located on the upstream side Dau in the axial direction Da relative to the trailing edge 53. In addition, in this state, both the suction-side surface 54 and the pressure-side surface 55 face a direction having a component of the circumferential direction Dc.

The platform 60 is a plate-shaped member spreading from an end in the blade height direction Dwh of the blade body 51 in a direction having a component perpendicular to the blade height direction Dwh. The platform 60 has a gas path surface 61, a shaft-side surface 62, a pair of lateral end surfaces 63, and a pair of front-back end surfaces 64. The gas path surface 61 faces the leading end side Dwht in the blade height direction Dwh and comes in contact with the combustion gas G. The shaft-side surface 62 is located back-to-back with the gas path surface 61 and faces the base end side Dwhs. The pair of lateral end surfaces 63 face opposite sides in a width direction Dwp that has a component perpendicular to the blade height direction Dwh and a chord direction Dwc. The pair of front-back end surfaces 64 face opposite sides in the chord direction Dwc. The chord direction Dwc is a direction parallel to a chord Leo. In the state where the blade 50 is mounted on the rotor shaft 42, a direction having a component of the axial direction Da coincides with the chord direction Dwc, and a direction having a component of the circumferential direction Dc coincides with the width direction Dwp.

The gas path surface 61 of the platform 60 is a surface spreading in a direction having a component. perpendicular to the blade height direction Dwh. Both the pair of lateral end surfaces 63 spread in a direction having a component perpendicular to the width direction Dwp and join to the gas path surface 61. Both the pair of front-back end surfaces 64 spread in a direction having a component perpendicular to the chord direction Dwc and join to the gas path surface 61. Of the pair of lateral end surfaces 63, one lateral end surface 63 forms a suction-side end surface 63n and the other lateral end surface 63 forms a pressure-side end surface 63p. Of the pair of front-back end surfaces 64, one front-back end surface 64 forms a front end surface 64f and the other front-back end surface 64 forms a back end surface 64b.

The suction-side end, surface 63n and the pressure-side end surface 63p are parallel to each other. The front end surface 64f and the back end surface 64b are parallel to each other. Thus, the platform 60 has a parallelogram shape when seen from the blade height direction Dwh in the state where the blade 50 is mounted on the rotor shaft 42, the front end surface 64f and the back end surface 64b are surfaces perpendicular to the axial direction Da. In addition, in this state, the front end surface 64f is located on the upstream side Dau in the axial direction Da relative to the hack end surface 64b. Hereinafter, in the chord direction Dwc, the side of the front end surface 64f relative to the back end surface 64b will be referred to as a chord front side Dwcf, and the opposite side from the chord front side Dwcf will be referred to as a chord back side Dwch. In the width direction Dwp, the side of the suction-side end surface 63n relative to the pressure-side end surface 63p will he referred to simply as a suction side Dpn, and the opposite side from the suction side Dpn will he referred to simply as a pressure side Dpp.

The shaft-mounted part 90 has a shank 91 that extends from the platform 60 toward the opposite side from the blade body 51 in the blade height direction Dwh, and a blade root 92 that extends from the shank 91 toward the opposite side from the blade body 51 in the blade height direction Dwh. A cross-section of the blade root 92 perpendicular to the chord Leo has a Christmas tree shape. The blade root 92 is fitted into a blade root groove (not shown) of the rotor shaft 42 (see FIG. 1).

Figure 3:
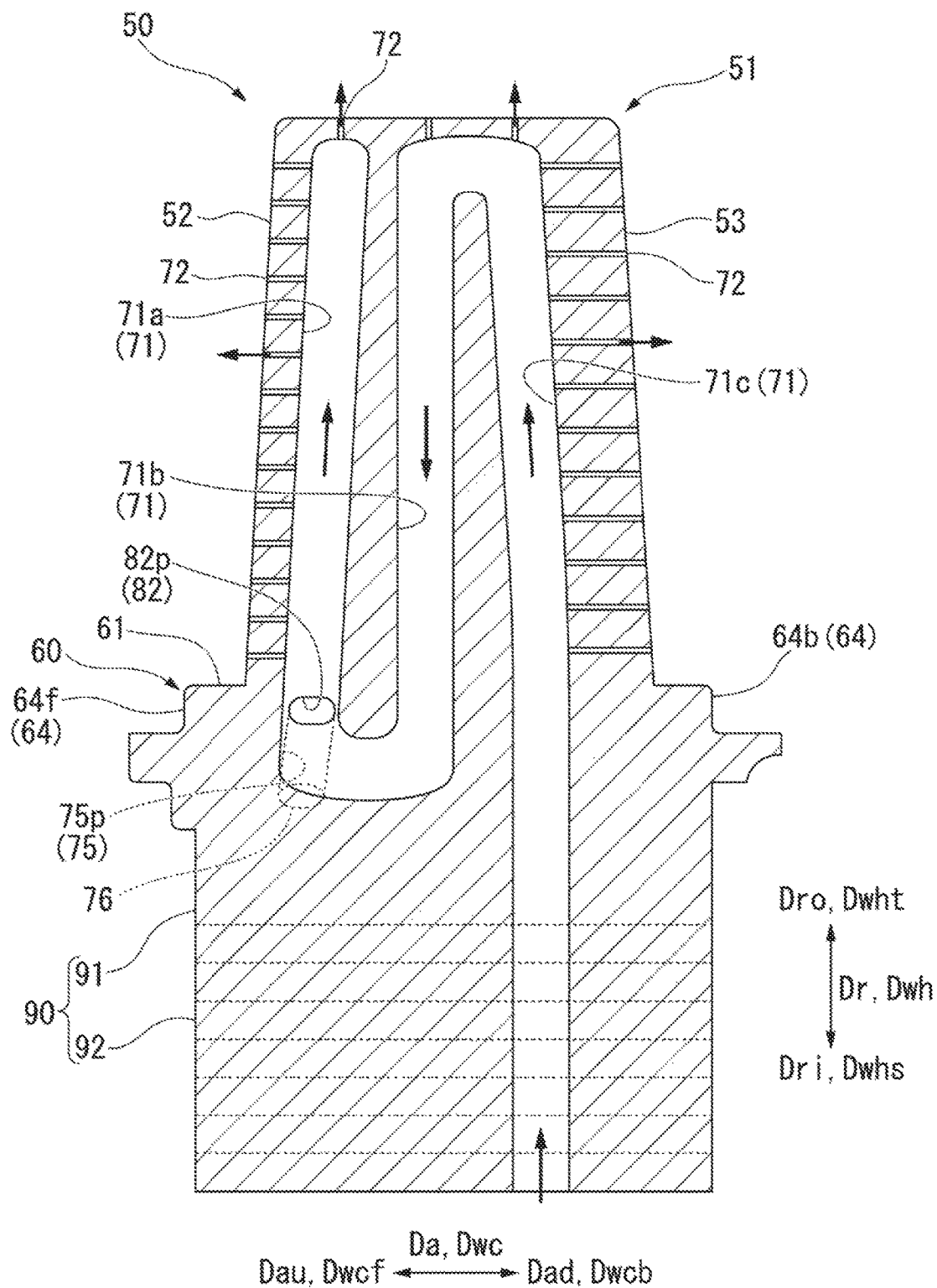
FIG. 3 is a sectional view showing a cross-section of the blade in a plane along a camber line according to the embodiment of the present invention.
Figure 4:
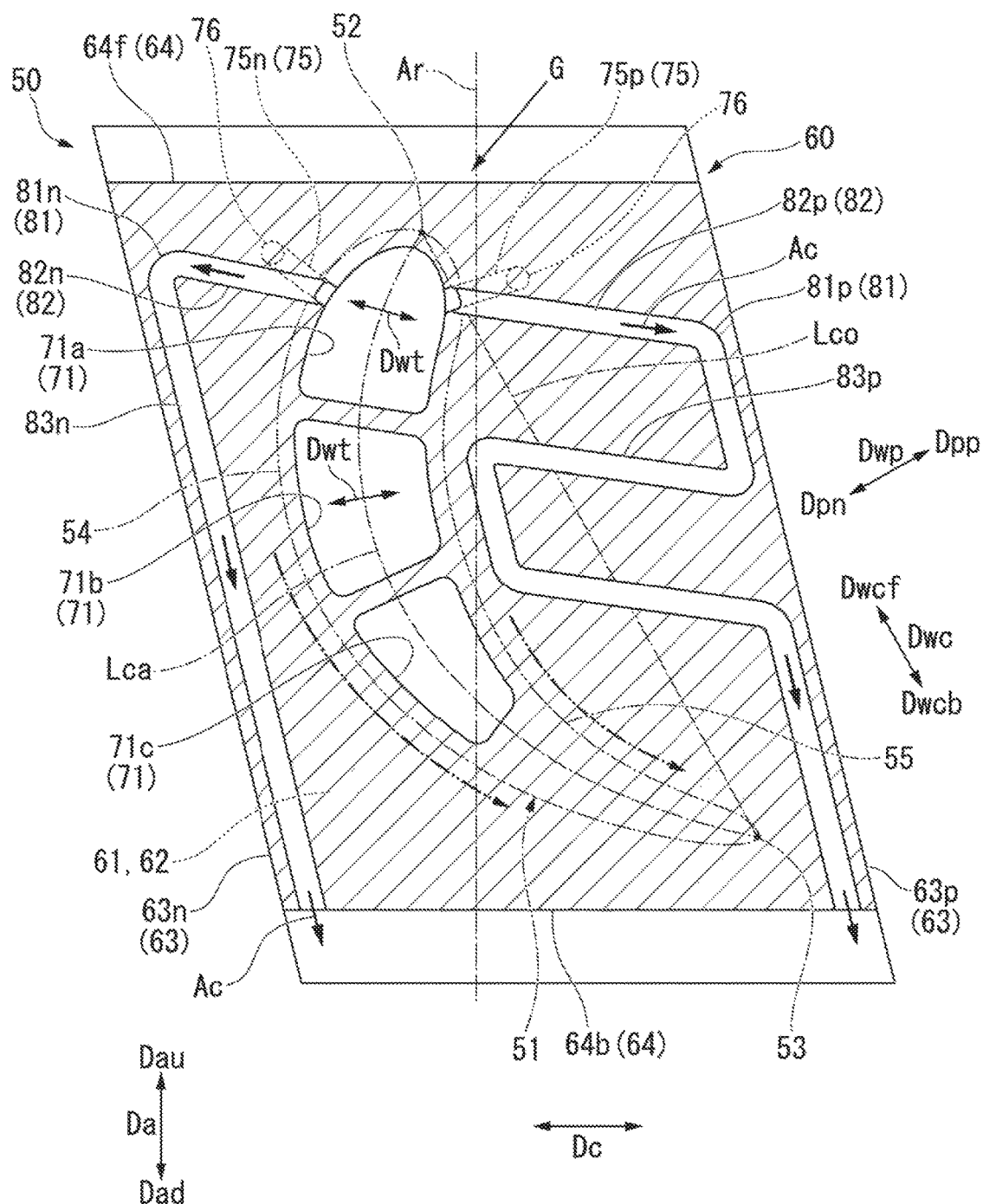
FIG. 4 is a sectional view showing a cross-section of a platform in a plane perpendicular to a blade height direction according to the embodiment of the present invention.

As shown in FIG. 2 to FIG. 4, a plurality of blade passages 71 extending in the blade height direction Dwh are formed inside the blade 50. Each blade passage 71 is formed continuously through the blade body 51, the platform 60, and the shaft-mounted part 90. The plurality of blade passages 71 are arrayed along a camber line Lea (see FIG. 4) of the blade body 51. Adjacent blade passages 71 communicate with each other at an end part in the blade height direction Dwh. At least one of the plurality of blade passages 71 open at an end of the blade root 92 in the blade height direction Dwh. Cooling air Ac from a cooling air passage formed inside the rotor shaft 42 flows into this blade passage 71 through an opening thereof.

For example, three blade passages 71 are formed inside the blade 50 of this embodiment. Of these three blade, passages 71, the blade passage 71 located farthest on the chord front side Dwcf will be referred to as a first blade passage 71a; the blade passage 71 located on the chord back side Dwcb of and adjacent to the first blade passage 71a will be referred to as a second blade passage 71b; and the blade passage 71 located on the chord back side Dwcb of and adjacent to the second blade passage 71b will be referred to as a third blade passage 71c. The third blade passage 71c opens at the end of the blade root 92 in the blade height direction Dwh. The third blade passage 71c and the second blade passage 71b communicate with each other at a part on the leading end side Dwht in the blade height direction Dwh. The second blade passage 11 and the first blade passage 71a communicate with each other at a part on the base end side Dwhs in the blade height direction Dwh. A plurality of blade surface blowout passages 72 opening in an outer surface of the blade body 51 are formed in the blade passages 71. For example, a plurality of blade surface blowout passages 72 that extend from the third blade passage 71c toward the chord back side Dwcb and open in the outer surface of the blade body 51 are formed in the third blade passage 71c. A plurality of blade surface blowout passages 72 that extend from the first blade passage 71a toward the chord front side Dwcf and open in the outer surface of the blade body 51 are formed in the first blade passage 71a.

The blade body 51 is convectively cooled in the process of the cooling air Ac flowing through the blade passages 71. The cooling air Ac having flowed into the blade passage 71 flows into the blade surface blowout passages 72, and flows out of the blade surface blowout passages 72 into the combustion gas flow passage 49. Thus, the leading edge 52, the trailing edge 53, etc. of the blade body 51 are cooled in the process of the cooling air e flowing through the blade surface blowout passages 72. Moreover, part of the cooling air Ac having flowed out of the blade surface blowout passages 72 into the combustion gas flow passage 49 serves also as film air by partially covering the surface of the blade body 51.

Platform passages 81 that extend inside the platform 60 in directions along the gas path surface 61 are formed inside the platform 60. As shown in FIG. 4, the platform passages 81 include a suction-side platform passage 81n that is formed on the suction side Dpn relative to the blade body 51, and a pressure-side platform passage 81p that is firmed on the pressure side Dpp relative to the blade body 51.

The suction-side platform passage 81n has an inflow passage portion 82n that extends is a direction having a component of a blade thickness direction Dwt, and a lateral end passage portion 83n that extends along the suction-side end surface 63n of the platform 60. The inflow passage portion 82n extends from a position near an inner surface of the first blade passage 71a on the suction side Dpn, in a direction having a component of the blade thickness direction Dwt based on that position, to a position near the suction-side end surface 63n. The lateral end passage portion 83n extends from an end of the inflow passage portion 82n on the suction side Dpn toward the chord back side Dwcb along the suction-side end surface 63n, and opens in the back end surface 64h of the platform 60. The blade thickness direction Dwt is sometimes defined as a direction perpendicular to the blade height direction Dwh as well as to the chord direction Dwc, but the blade thickness direction Dwt here is a direction perpendicular to the blade height direction Dwh as well as to the camber line Lca. The camber line Lea is typically a curved line. Therefore, the blade thickness direction Dwt varies according to the position on the camber line Lea.

The pressure-side platform passage 81p has an inflow passage portion 82p that extends in a direction having a component of the blade thickness direction Dwt, and a meander passage portion 83p that meanders inside the platform 60. The inflow passage portion 82p extends from a position near the inner surface of the first blade passage 71a on the pressure side Dpp, in a direction having a component of the blade thickness direction Dwt based on that position, to a position near the pressure-side end surface 63p, The meander passage portion 83p extends from an end of the inflow passage portion 82p on the pressure side Dpp toward the chord back side Dwcb while meandering in the width direction Dwp, and opens in the back end, surface 64b of the platform 60.

Communication passages 75 that each provide communication between the blade passage 71 and the platform passage 81 are further formed inside the blade 50. The communication passages 75 include a suction-side communication passage 75n that provides communication between the first blade passage 71a and the suction-side platform passage 81n, and a pressure-side communication passage 75p that provides communication between the first blade passage 71a and the pressure-side platform passage 81p.

Figure 5:
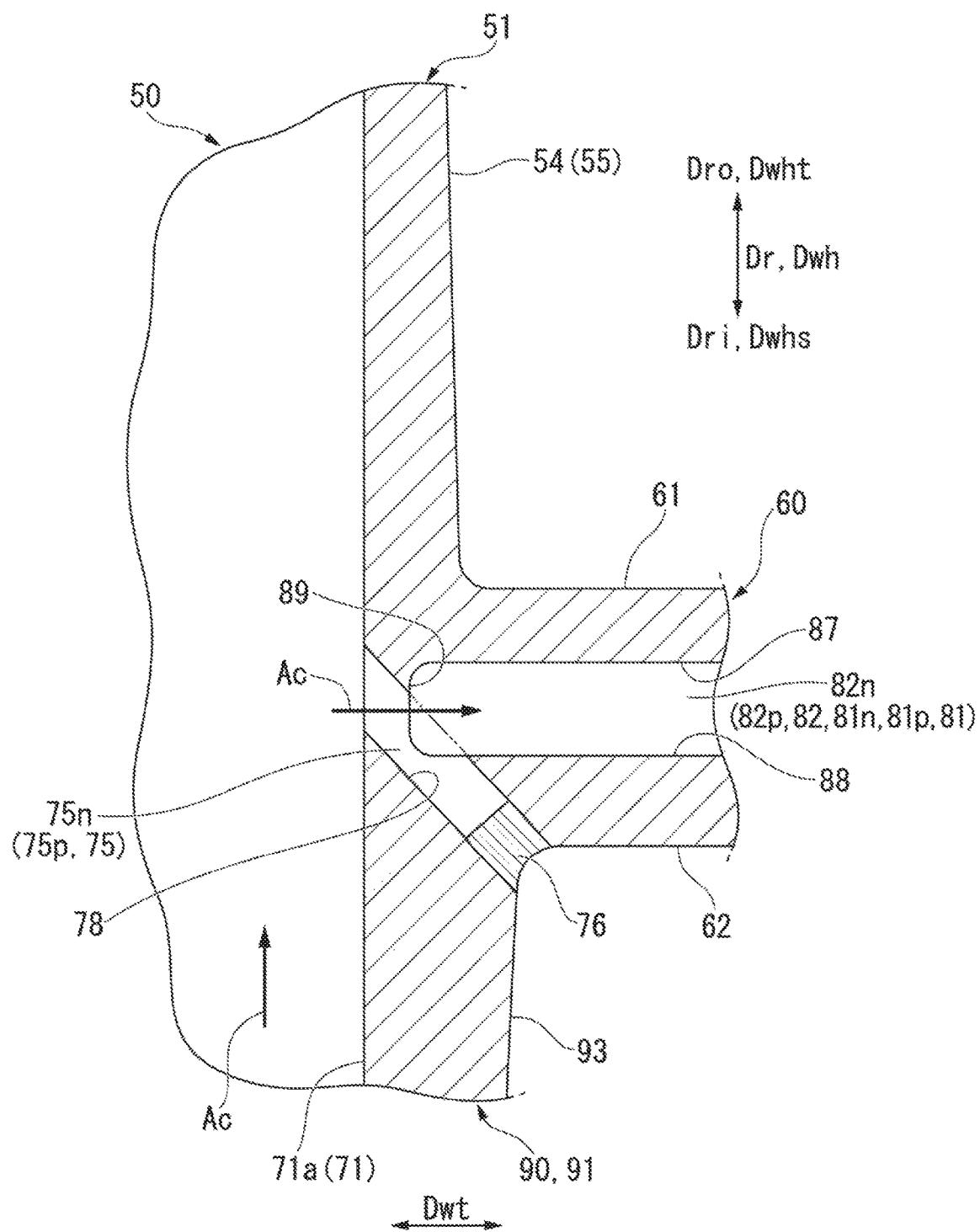
FIG. 5 is a sectional view showing a cross-section of a main part of the blade in a plane spreading in a blade thickness direction according to the embodiment of the present invention.

As shown in FIG. 5, the suction-side communication passage 75n leads from a surface forming a corner between the shaft-side surface 62 of the platform 60 and an outer surface 93 of the shaft-mounted part 90 through the inflow passage portion 82n of the suction-side platform passage 81n to the first blade passage 71a. The suction-side communication passage 75n extends linearly in the blade thickness direction Dwt from the surface forming the corner toward the first blade passage 71a while also extending in the blade height direction Dwh. An opening of the suction-side communication passage 75n in the surface forming the corner is blocked with a sealing member 76.

An inner, surface forming the suction-side platform passage 81n includes a gas path-side inner surface 87 that spreads in a direction having more of a component of the blade thickness direction Dwt than a component of the blade height direction Dwh and faces the side of the shaft-side surface 62, and a shaft-side inner surface 88 that spreads in a direction having more of a component of the blade thickness direction Dwt than a component of the blade height direction Dwh and at least partially faces the gas path-side inner surface 87. An inner surface forming the inflow passage portion 82n of the suction-side platform passage 81n includes, other than the gas path-side inner surface 87 and the shaft-side inner surface 88 described above, an end inner surface 89 that spreads from an end of the shaft-side inner surface 88 on the side of the first blade passage 71a in a direction having a component of the blade height direction Dwh and joins to an end of the gas path-side inner surface 87 on the side of the first blade passage 71a.

The suction-side communication passage 75n is formed by a through-hole that extends to the first blade passage 71a through a corner between the shaft-side inner surface 88 and the end inner surface 89 of the inflow passage portion 82n. Thus, an inner surface 78 of the suction-side communication passage 75n intersects with and joins to the shaft-side inner surface 88 and the end inner surface 89 of the inflow passage portion 82n.

The pressure-side communication passage 75p leads from a surface forming a corner between the shaft-side surface 62 of the platform 60 and the outer surface 93 of the shaft-mounted part 90 through the inflow passage portion 82p of the pressure-side platform passage 81p to the first blade passage 71a. The pressure-side communication passage 75p extends linearly in the blade thickness direction Dwt from the surface forming the corner toward the first blade passage 71a while also extending in the blade height direction Dwh. An opening of the pressure-side communication passage 75p in the surface forming the corner is blocked with a sealing member 76.

An inner surface forming the pressure-side platform passage 81p also includes a gas path-side inner surface 87 that extends in a direction having more of a component of the blade thickness direction Dwt than a component of the blade height direction Dwh and faces the side of the shaft-side surface 62, and a shaft-side inner surface 88 that spreads in a direction having more of a component of the blade thickness direction Dwt than a component of the blade height direction Dwh and at least partially faces the gas path-side inner surface 87. An inner surface forming the inflow passage portion 82p of the pressure-side platform passage 81p also includes, other than the gas path-side inner surface 87 and the shaft-side inner surface 88 described above, an end inner surface 89 that spreads from an end of the shaft-side inner surface 88 on the side of the first blade passage 71a in a direction having a component of the blade height direction Dwh and joins to an end of the gas path-side inner surface 87 on the side of the first blade passage 71a.

The pressure-side communication passage 75p is formed by a through-hole that extends to the first blade passage 71a through a corner between the shaft-side inner surface 88 and the end inner surface 89 of the inflow passage portion 82p. Thus, an inner surface 78 of the pressure-side communication passage 75p intersects with and joins to the shaft-side inner surface 88 and the end inner surface 89 of the inflow passage portion 82p. As has been described above, the configuration of the suction-side communication passage 75n and the configuration of the pressure-side communication passage 75p are basically the same.

Part of the cooling air Ac flowing through the first blade passage 71a flows through the suction-side communication passage 75n and flows into the inflow passage portion 82n of the suction-side platform passage 81n. In the process of flowing through the inflow passage portion 82n, the cooling air Ac convectively cools a part of the platform 60 near the inflow passage portion 82n. Thus, a part of the gas path surface 61 near the inflow passage portion 82n is cooled. The cooling air Ac flows from the inflow passage portion 82n into the lateral end passage portion 83n. In the process of flowing through the lateral end passage portion 83n, the cooling air Ac convectively cools a part of the platform 60 near the lateral end passage portion 83n. Thus, a part of each of the gas path surface 61 and the suction-side end surface 63n near the lateral end passage portion 83n is cooled. The cooling air Ac blows to the outside from an opening of the lateral end passage portion 83n formed in the back end surface 64b of the platform 60. Thus, the back end surface 64b of the platform 60 is cooled with the cooling air Ac.

Another portion of the cooling air Ac flowing through the first blade passage 71a flows through the pressure-side communication passage 75p and flows into the inflow passage portion 82p of the pressure-side platform passage 81p. In the process of flowing through the inflow passage portion 82p, the cooling air Ac convectively cools a part of the platform 60 near the inflow passage portion 82p. The cooling air Ac flows from the inflow passage portion 82p into the meander passage portion 83p. In the process of flowing through the meander passage portion 83p, the cooling air Ac convectively cools a part of the platform 60 near the meander passage portion 83p. The cooling air Ac blows to the outside from an opening of the meander passage portion 83p formed in the back end surface 64b of the platform 60. Thus, the back end surface 64*b* of the platform 60 is cooled with the cooling air Ac.

Next, a manufacturing method of the blade 50 having been described above will be described with reference to the flowchart shown in FIG. 6.

First, an intermediate product of the blade 50 is formed by casting (S1: intermediate product firming step). In the intermediate product forming step (S1), a casting mold forming step (S2), a core forming step (S3), a casting step (S4), and a core inching step (S5) are performed.

In the casting mold forming step (S2), a casting mold that has an internal space matching the external shape of the blade 50 is formed. In the casting mold forming step (S2), for example, the casting mold is formed by the lost-wax method. In the lost-wax method, first, a wax model representing the external shape of the blade 50 is formed. Next, the wax model is placed in a slurry containing a fire-resistant powder etc., and then this slurry is dried. Thereafter, the wax model is removed from the dried slurry, and this slurry is used as a casting mold.

In the core forming step (S3), a blade passage core that has an external shape matching the shape of the blade passage 71 and a platform passage core that has an external shape matching the shape of the platform passage 81 are formed.

Both the blade passage core and the platform passage core are made from ceramics, such as alumina. The core forming step (S3) may be performed in parallel with the casting mold forming step (S2), or may be performed before or after the casting mold forming step (82). The formation of the blade passage core and the formation of the platform passage core may be performed in parallel with each other, or may be performed at different timings.

In the casting step (S4), the blade passage core and the platform passage core are disposed inside the casting mold, and molten metal is poured into the casting mold. For example, this molten metal is a melt of a nickel-base alloy etc. that has high heat resistance.

After the molten metal poured into the casting mold has hardened, the core melting step (S5) is performed. In the core melting step (S5), the ceramic blade passage core and platform passage core are melted by an alkaline water solution.

Figure 7:
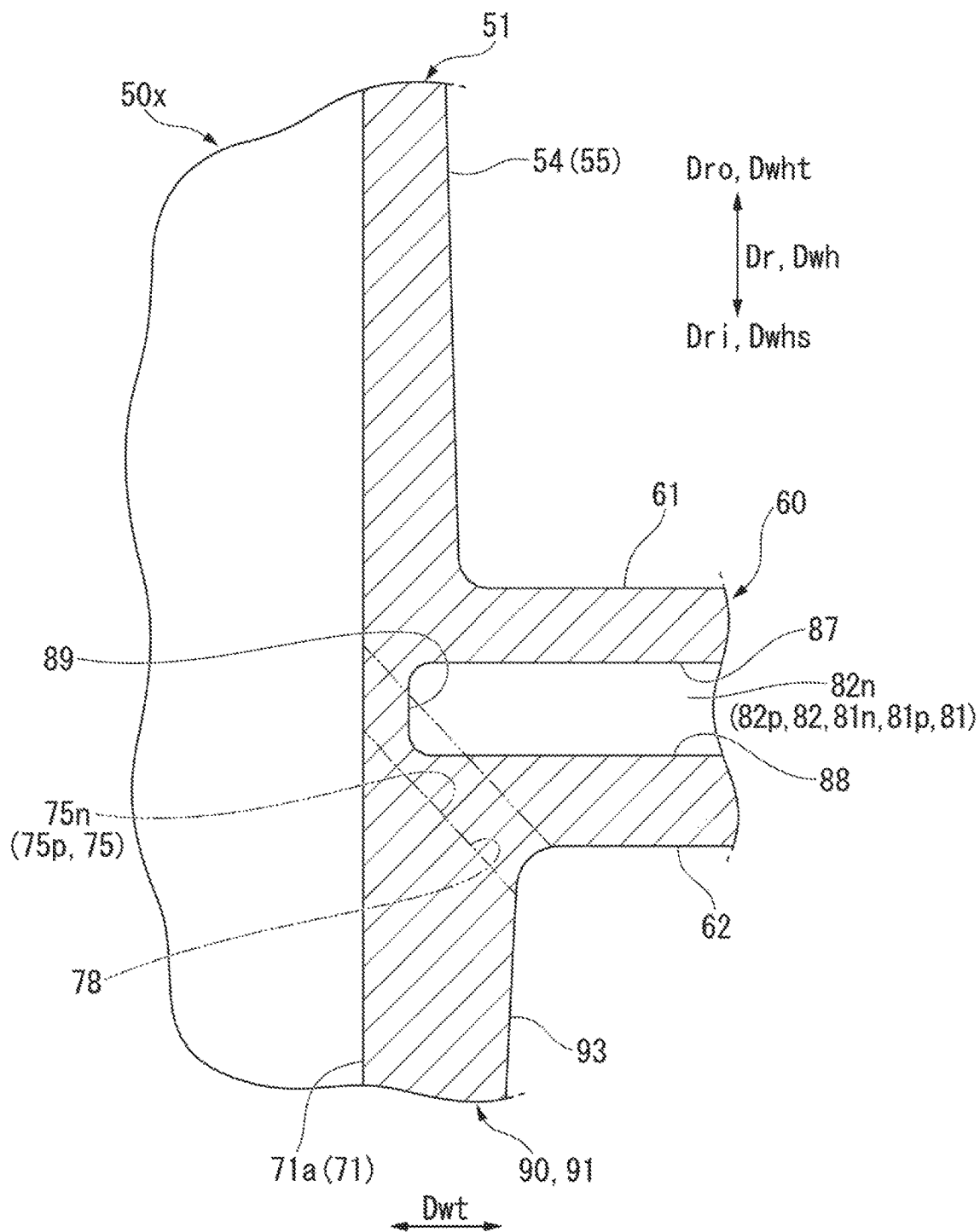
FIG. 7 is a sectional view showing a cross-section of a main part of a blade intermediate product in a plane spreading in the blade thickness direction according to the embodiment of the present invention.

This is the end of the intermediate product forming step (S1), and an, intermediate product of the blade 50 is completed. As shown in FIG. 7, this intermediate product 50*x* has the blade body 51, the platform 60, and the shaft-mounted part 90. The blade passage 71 and the platform passage 81 are formed inside the intermediate product 50*x*. However, the communication passage 75 is not formed inside the intermediate product 50*x*.

Next, the communication passage 75 extending from an outer surface of the intermediate product 50*x* to the blade, passage 71 inside the intermediate product 50*x* is formed (S6: communication passage forming step). In the communication passage forming step (S6), a through-hole as the communication passage 75 is formed inside the intermediate product 500 as shown in FIG. 7 by electro-chemical machining or electric discharge machining. This though-hole is a linear hole that extends from a surface forming a corner between the shaft-side surface 62 of the platform 60 and the outer surface 93 of the shaft-mounted part 90 through the inflow passage portion 82 of the platform passage 81 to the first blade passage 71*a*. Thus, as described above, the inner surface 78 of the communication passage 75 intersects with and joints to the shaft-side inner surface 88 and the end inner surface 89 of the inflow passage portion 82. In the communication passage forming step (S6), first, a through-hole is formed that extends from the surface forming the corner between the shaft-side surface 62 of the platform 60 and the outer surface 93 of the shaft-mounted part 90 to the shaft-side inner surface 88 of the inflow passage portion 82 of the platform passage 81. Then, a through-hole that extends from the inner surface forming the inflow passage portion 82 to the first blade passage 71*a* is formed, and thereby the through-hole as the communication passage 75 is formed.

It is possible to form, by casting, an intermediate product in which the blade passage 71, the platform passage 81, and the communication passage 75 are formed. In this case, a core in which a blade passage core, a platform passage core, and a communication passage core are integrated is prepared, and this core, is disposed inside the casting mold to form the intermediate product. The blade passage 71 is a passage that is formed along a plane spreading in the blade height direction Dwh The platform passage 81 is a passage that is formed along a plane spreading in a direction perpendicular to the blade height direction Dwh. Accordingly, the blade passage core has a shape along the plane spreading in the blade height direction Dwh, while the platform passage core has a shape along the plane spreading in the direction perpendicular to the blade height direction Dwh. Therefore, in the case where the above-mentioned integrated core is formed, improperly handling this integrated core is highly likely to cause damage to the communication passage core for forming the communication passage 75 that provides communication between the blade passage 71 and the platform passage 81.

In this embodiment, therefore, after the intermediate product 50*x* in which the blade passage 71 and the platform passage 81 are formed is formed, the communication passage 75 is formed in the intermediate product 50*x* by machining etc.

Next, the opening of the communication passage 75 in the surface forming the corner between the shaft-side surface 62 of the platform 60 and the outer surface 93 of the shaft-mounted part 90 is blocked with the sealing member 76 (S7: sealing step). In this sealing step (S7), the sealing member 76 is placed inside the communication passage 75 through the opening of the communication passage 75, and the sealing member 76 is welded to the intermediate product from the outer surface of the intermediate product.

Next, a finishing process is performed on the intermediate product in which the communication passage 75 has been formed, to complete the blade 50 (S8: finishing step). In the finishing step (S8), for example, the outer surface of the intermediate product is polished. As necessary, a thermal barrier coating is applied to the outer surface of the intermediate product.

Next, effects of the blade 50 of this embodiment will he described. First, a blade 50*z* of a comparative example will be described.

Figure 8:
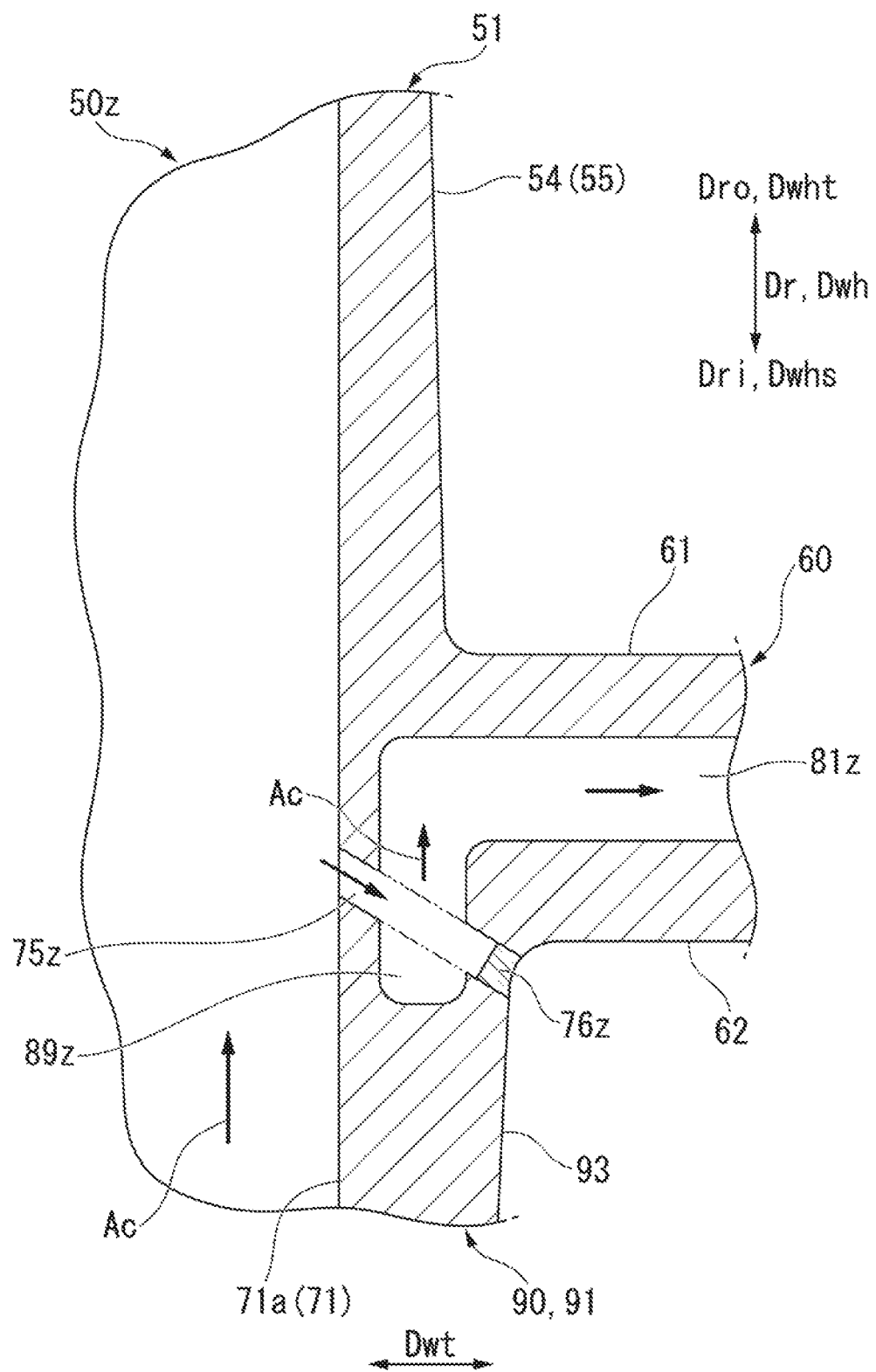
FIG. 8 is a sectional view showing a cross-section of a main part of a blade in a plane spreading in the blade thickness direction according to a comparative example.

As shown in FIG. 8, the blade 50*z* of the comparative example also has the blade body 51, the platform 60, and the shaft-mounted part 90. The blade passage 71 through which the cooling air Ac flows is formed inside the blade body 51, the platform 60, and the shaft-mounted part 90 so as to extend in the blade height direction Dwh. The platform 60 has the gas path surface 61 that faces the blade height direction Dwh and comes in contact with combustion gas, and the shaft-side surface 62 that is located back-to-back with the gas path surface 61. This platform 60 further has a platform passage 81*z* which extends between the gas path surface 61 and the shaft-side surface 62 in the blade thickness direction Dwt and through which the cooling air Ac flows, and a turndown extension portion 89 that extends from an end of the platform passage 81z on the side of the blade passage 71 toward the side away from the gas path surface 61. A communication passage 75z that leads from the outer surface at the corner between the shaft-side surface 62 of the platform 60 and the outer surface 93 of the shaft-mounted part 90 trough the turndown extension portion 89z to the blade passage 71 is formed inside the platform 60 and the shaft-mounted part 90. An opening of the communication passage 75z in die outer surface at the corner is blocked with a plug 76z etc.

The blade 50z of this comparative example is also basically formed by casting. The blade passage 71, the platform passage 81z, and the turndown extension portion are formed by a casting process using cores that have external shapes thing their respective shapes. In an intermediate product of the blade 50z formed by casting, the platform passage 81z and the turndown extension portion 89z communicate with each other, while the turndown extension portion 89z and the blade passage 71 do not communicate with each other. The communication passage 75z is formed after this intermediate product is formed. Specifically, a through-hole that extends from the outer surface at the corner of the intermediate product through the turndown extension portion 89z to the blade passage 71 is formed by machining. This through-hole extends linearly in the blade thickness direction Dwt from the surface forming the corner toward the blade passage 71 while also extending in the blade height direction Dwh. Thus, this through-hole is a hole that is inclined relative to the blade height direction Dwh and the blade thickness direction Dwt. This through-hole, i.e. the communication passage 75z, bisects the turndown extension portion 89z into a part on the side of the gas path surface 61 and a part on the side of the shaft-side surface 62. Moreover, this through-hole extends through a pair of inner surfaces that are a part of an inner surface forming the turndown extension portion 89z, and that spread in the blade height direction Dwh and face each other in the blade thickness direction Dwt.

In the blade 50z of this comparative example, the turndown extension portion 89z is formed in addition to the communication passage 75z, to provide communication between the blade passage 71 and the platform passage 81z. Accordingly, in the blade 50z of this comparative example, the strength near the joint between the shaft-mounted part 90 and the platform 60 is reduced by the presence of the turndown extension portion 89z.

In the blade 50z of this comparative example, when the cooling air Ac flowing through the blade passage 71 from the base end side Dwhs toward the leading end side Dwht flows into the communication passage 75z, the cooling air Ac turns into a flow directed from the leading end side Dwht toward the base end side Dwhs. After flowing from the communication passage 75z into the turndown extension portion 89z, the cooling air Ac flows through the turndown extension portion 89z from the base end side Dwhs toward the leading end side Dwht. After flowing from the turndown extension portion 89z into the platform passage 81z, the cooling air Ac flows through the platform passage 81z in the blade thickness direction Dwt. Thus, in the blade 50z of this comparative example, the cooling air Ac flows so as to meander in the blade height direction Dwh in the, process of the cooling air Ac flowing from the blade passage 71 into the platform passage 81z. Accordingly, the blade 50z of the comparative example causes a large pressure loss of the cooling air Ac in the process of the cooling air Ac flowing from the blade passage 71 into the platform passage 81z.

Moreover, in the blade 50z of the comparative example, the component of velocity of the cooling air Ac in the blade thickness direction Dwt decreases in the process of the cooling air Ac flowing from the turndown extension portion 89z into the platform passage 81z, so that the effect of convective cooling by the cooling air Ac flowing through a part of the platform passage 81z closer to the turndown extension portion 89z decreases accordingly. Thus, in the blade 50z of the comparative example, the cooling effect on a part of the gas path surface 61 near the turndown extension portion 89z, i.e., a part of the gas path surface 61 near the blade body 51 decreases.

By contrast, in the blade 50 of this embodiment, the inner surface 78 of the communication passage 75 is joined to the shaft-side inner surface 88 that is a part of the inner surface of the platform passage 81 as shown in FIG. 5. This makes it possible to provide communication between the blade passage 71 and the platform passage 81 without forming the turndown extension portion 89z as in the comparative example. Therefore, the blade 50 of this embodiment does not have the turndown extension portion 89z. Thus, the blade 50 of this embodiment can avoid the reduction of the blade strength insulting from the formation of the turndown extension portion 89z.

Since the turndown extension portion 89z is not formed in the blade 50 of this embodiment, compared with the blade 50z of the comparative example, a linear route toward the platform passage 81 is formed as a route of the cooling air Ac leading from the blade passage 71 to the platform passage 81. Thus, the blade 50 of this embodiment can reduce the pressure loss of the cooling air Ac occurring in the process of the cooling air Ac flowing from the blade passage 71 into the platform passage 81.

Moreover, since the turndown extension portion 89z is not formed in the blade 50 of this embodiment, the cooling air Ac from the communication passage 75 flows through the platform passage 81 without experiencing a decrease in the component of velocity in the blade thickness direction Dwt in which the platform passage 81 extends. Thus, the blade 50 of this embodiment can avoid the reduction of the cooling effect on the part of the gas path surface 61 near the blade body 51.

In particular, in this embodiment, the through-hole forming the communication passage 75 extends not only through the shaft-side inner surface 88 of the inflow passage portion 82 of the platform passage 81 but also through the end inner surface 89 facing the inner surface of the blade passage 71. Thus, a more linear route toward the platform passage 81 is thrilled as the route of the cooling air Ac leading from the blade passage 71 to the platform passage 81. Accordingly, this embodiment can further reduce the pressure loss of the cooling air Ac, as well as further avoid the reduction of the cooling effect on the part of the gas path surface 61 near the blade body 51. Moreover, since a more linear route is formed, this embodiment can facilitate inspection of the inside of the platform passage using an inspection instrument such as a borescope.

The communication passage 75 in this embodiment is a passage that provides communication between the first blade passage 71a and the platform passage 81. However, the communication passage 75 may instead be a passage that provides communication between a blade passage 71 other than the first blade passage 71a and the platform passage 81. For example, the communication passage 75 may be a passage that provides communication between the second blade passage 71b or the third blade passage 71c and the platform passage 81.

The number of the communication passages that provide communication between one platform passage 81 and the blade passage 71 is not limited to one but may be two or more. in this case, for example, in addition to the suction-side communication passage 75n of this embodiment, a suction-side communication passage may be provided that provides communication between the third blade passage 71c and the lateral end passage portion 83n that is a part of the platform passage 81. The position at which the platform passage 81 communicates with the blade passage 71 can he selected appropriately according to the design conditions etc. For example, this position of communication may be provided at an intermediate point of the meander passage portion 83p.

First Modified Example of Blade

Figure 9:
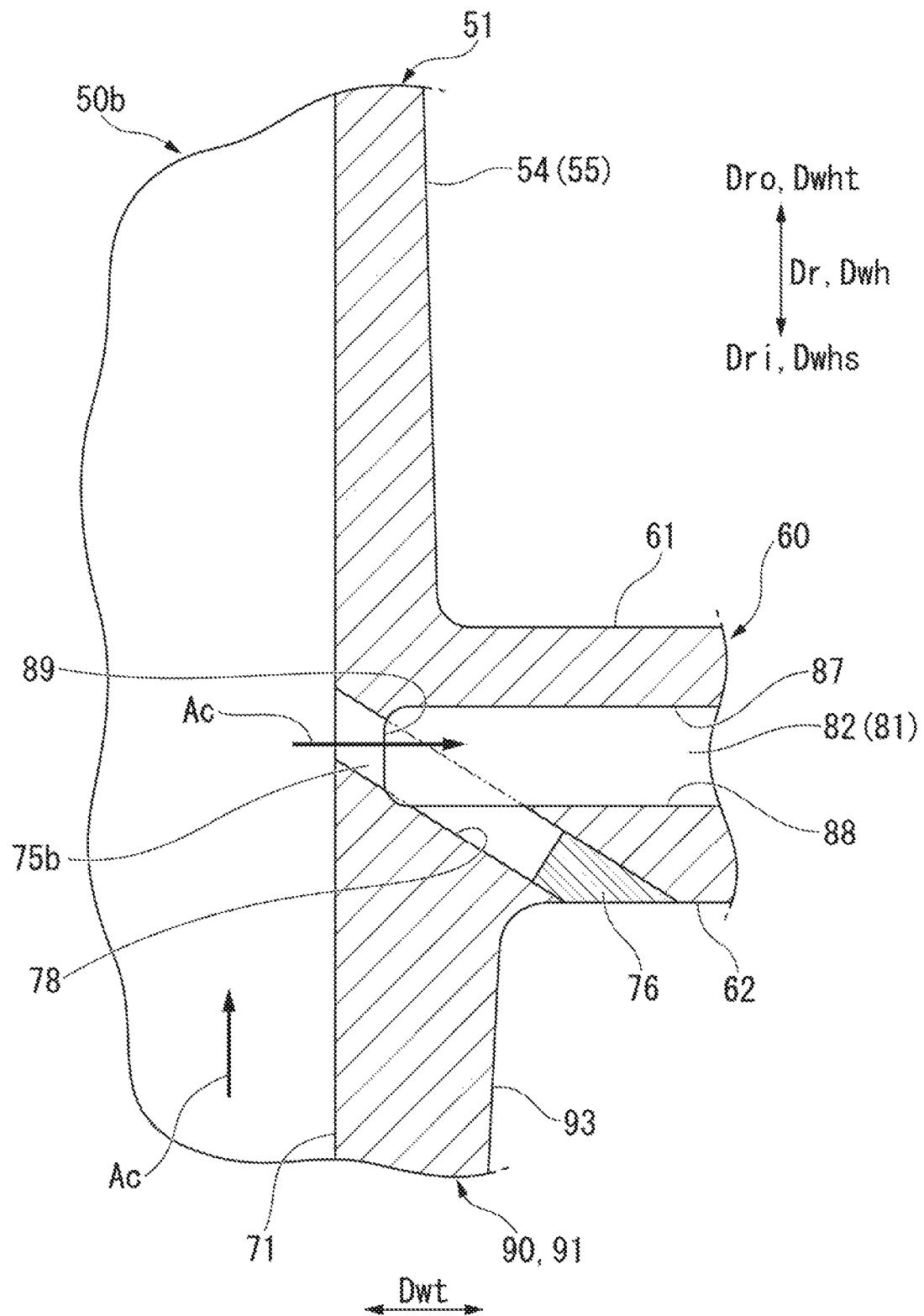
FIG. 9 is a sectional view showing a cross-section of a main part of a blade in a plane spreading in the blade thickness direction according to a first modified example of the present invention.

A first modified example of the blade of the above embodiment will be described with reference to FIG. 9.

In a blade 50b of this modified example, as in the above embodiment, a through-hole forming a communication passage 75b extends through the shaft-side inner surface 88 of the inflow passage portion 82 of the platform passage 81 and the end inner surface 89 thereof facing the inner surface of the blade passage 71. Thus, as in the communication passage of the above embodiment, the inner surface 78 of the communication passage 75b of this modified example also intersects with and joins to the shaft-side inner surface 88 and the end inner surface 89 of the inflow passage portion 82. However, unlike the through-hole of the above embodiment, the through-hole of this modified example does not extend through the corner between the shaft-side inner surface 88 and the end inner surface 89 of the inflow passage portion 82. Moreover, the through-hole of this embodiment does not extend through the corner between the gas path-side inner surface 87 and the end inner surface 89 of the inflow passage portion 82, either.

Thus, provided that the through-hole extends through the shaft-side inner surface 88 of the inflow passage portion 82, the through-hole does not have to extend through the corner between the shaft-side inner surface 88 and the end inner surface 89 and the corner between the gas path-side inner surface 87 and the end inner surface 89.

The through-hole forming the communication passage 75b of this modified example extends to the blade passage 71 from only the shaft-side surface 62 of the platform 60. Accordingly, unlike, the through-hole of the above embodiment, the through-hole of this modified example does not extend from both the shaft-side surface 62 and the outer surface 93 of the shaft-mounted part 90 to the blade passage 71. Thus, the through-hole may extend to the blade passage 71 from only the shaft-side surface 62 of the platform 60. Alternatively, the through-hole may extend to the blade passage 71 from only the outer surface 93 of the shaft-mounted part 90.

Second Modified Example of Blade

Figure 10:
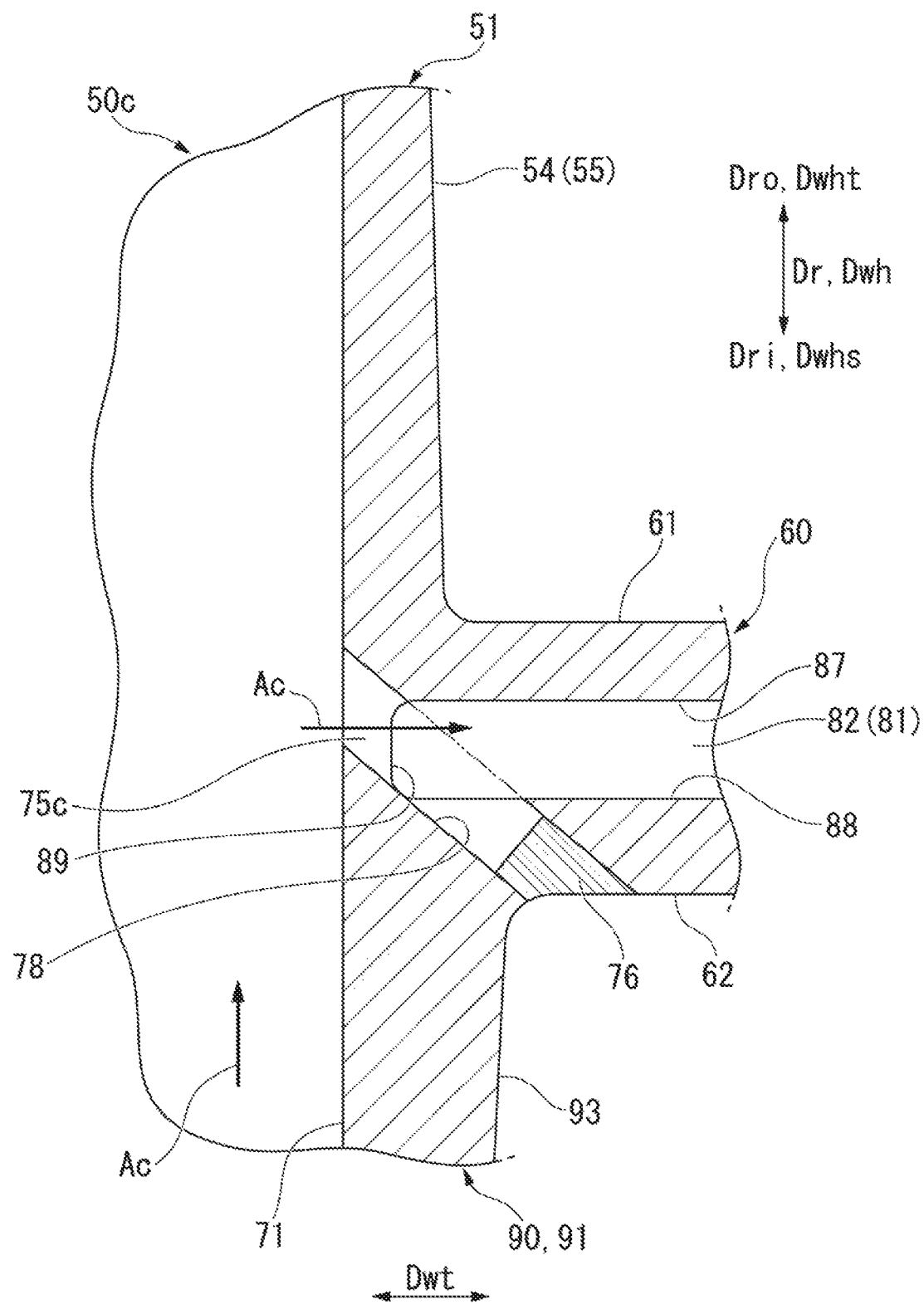
FIG. 10 is a sectional view showing a cross-section of a main part of a blade in a plane spreading in the blade thickness direction according to a second modified example of the present invention.

A second modified example of the blade of the above embodiment will be described with reference to FIG. 10.

In a blade 50O of this modified example, as in the above embodiment, a through-hole forming a communication passage 75e extends through the shaft-side inner surface 88 of the inflow passage portion 82 of the platform passage 81 and the end inner surface 89 thereof facing the inner surface of the blade passage 71. Thus, as in the communication passage of the above embodiment, the inner surface 78 of the communication passage 75c of this modified example also intersects with and joins to the shaft-side inner surface 88 and the end inner surface 89 of the inflow passage portion 82. However, unlike the through-hole of the above embodiment, the through-hole of this modified example extends through the corner between the shaft-side inner surface 88 and the end inner surface 89 of the inflow passage portion 82, as well as through the corner between the gas path-side inner surface 87 and the end inner surface 89 of the inflow passage portion 82. Thus, the inner surface 78 of the communication passage 75c of this modified example intersects with and joins to the gas path-side inner surface 87 of the inflow passage portion 82, too.

Thus, in this modified example, the passage through which the cooling air Ac flows from the blade passage 71 into the platform passage 81 is more linear, and the cross-sectional area of this passage is larger. Accordingly, the blade 50c of this modified example can further reduce the pressure loss of the cooling air Ac occurring in the process of the cooling air Ac flowing from the blade passage 71 into the platform passage 81.

Third Modified Example of Blade

Figure 11:
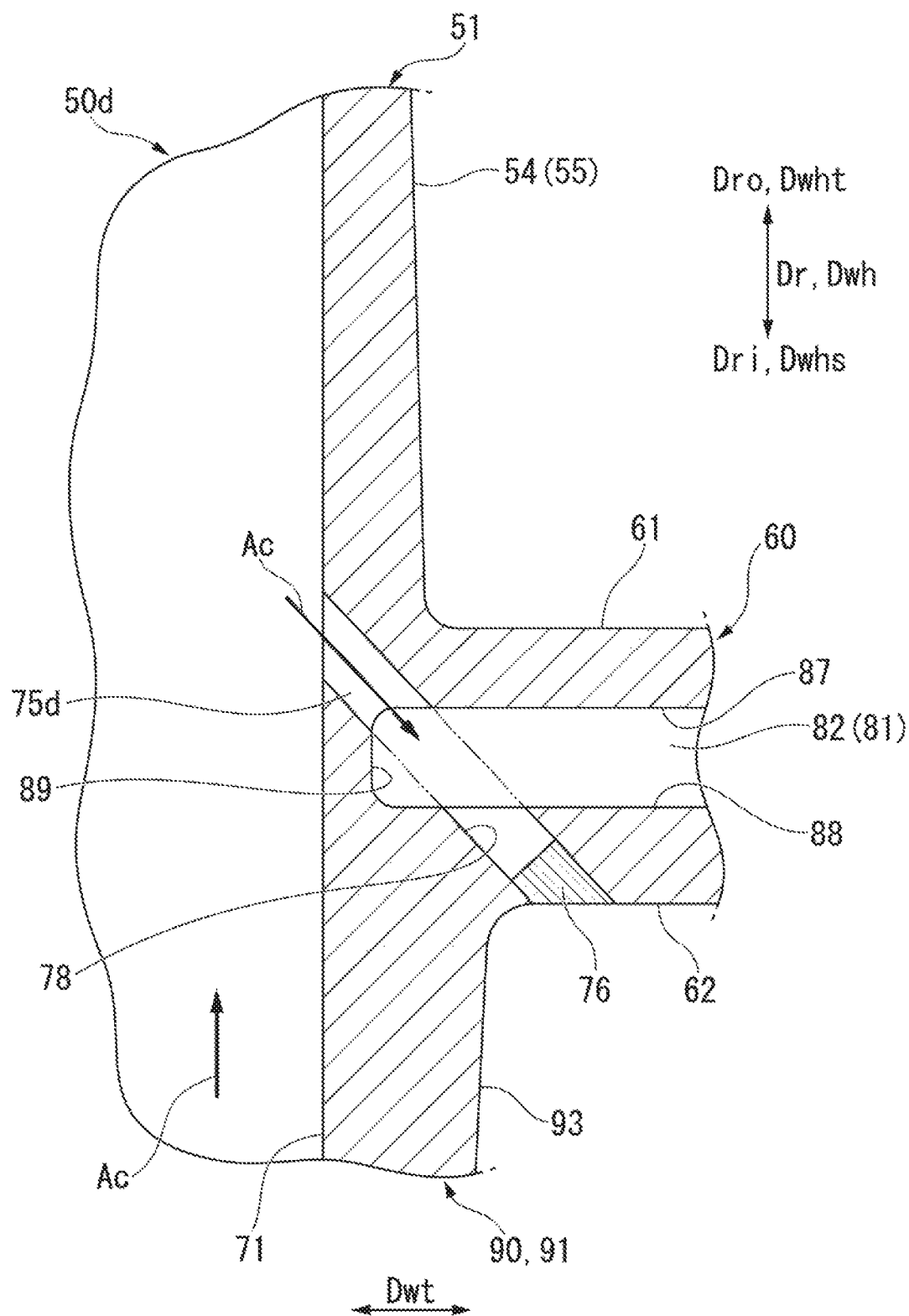
FIG. 11 is a sectional view showing a cross-section of a main part of a blade in a plane spreading in the blade thickness direction according to a third modified example of the present invention.

A third modified example of the blade of the above embodiment will be described with reference to FIG. 11.

In a blade 50d of this modified example, as in the above embodiment, a through-hole forming a communication passage 75d extends through the shaft-side inner surface 88 of the inflow passage portion 82 of the platform passage 81 and the end inner surface 89 thereof facing the inner surface of the blade passage 71. Accordingly, as in the communication passage of the above embodiment, the inner surface 78 of the communication passage 75d of this modified example also intersects with and joins to the shaft-side inner surface 88 and the end inner surface 89 of the inflow passage portion 82. However, unlike the through-hole of thee above embodiment, the through-hole of this modified example does not extend through the corner between the shaft-side inner surface 88 and the end inner surface 89 of the inflow passage portion 82 but extends through the corner between the gas path-side inner surface 87 and the end inner surface 89 of the inflow passage portion 82. Thus, the inner surface 78 of the communication passage 75d of this modified example intersects with and joins to the gas path-side inner surface 87 of the inflow passage portion 82, too.

Thus, the through-hole forming the communication passage 75d may extend through the gas path-side inner surface 87 of the inflow passage portion 82.

Fourth Modified Example of Blade

Figure 12:
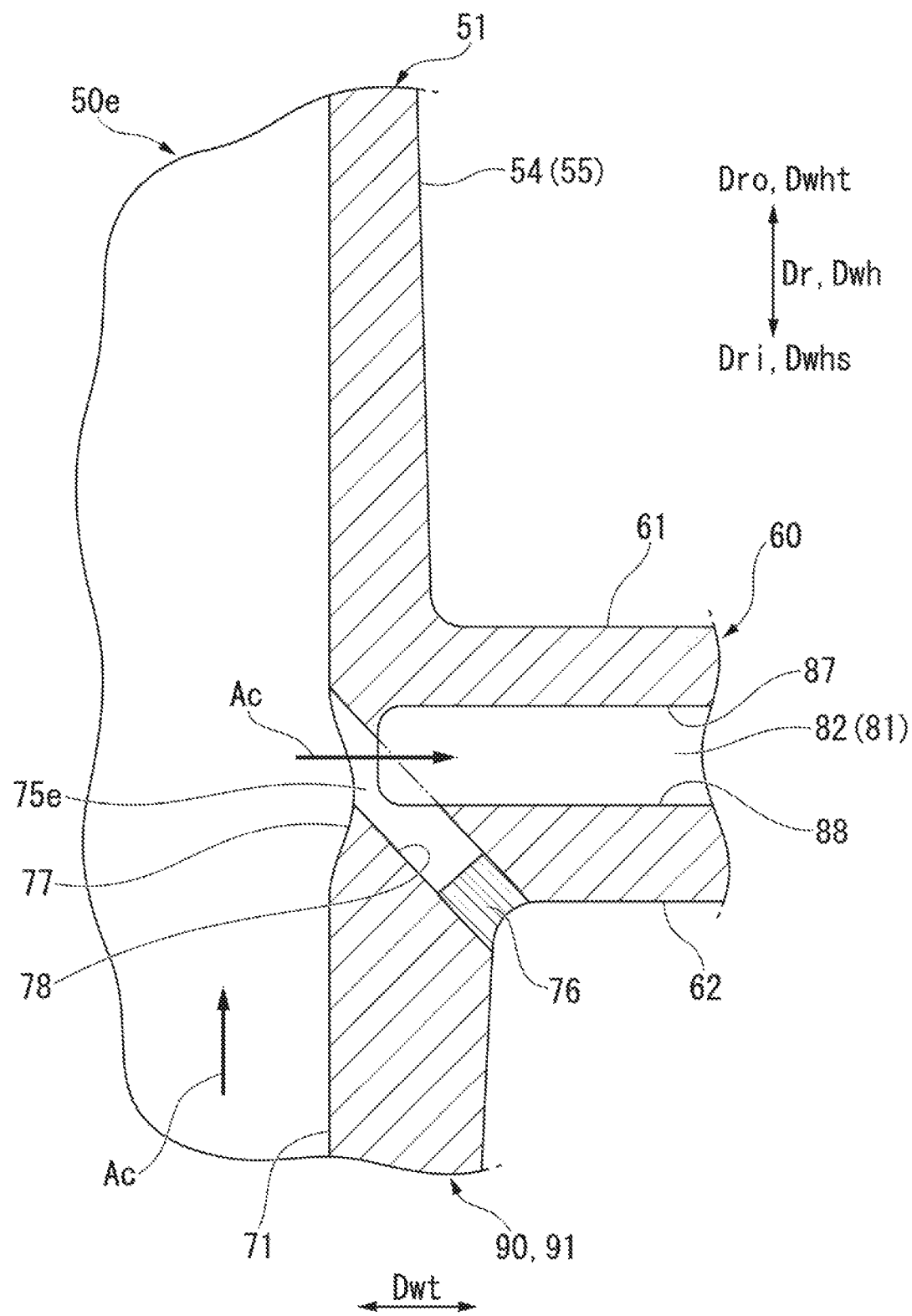
FIG. 12 is a sectional view showing a cross-section of a main part of a blade in a plane spreading in the blade thickness direction according to a fourth modified example of the present invention.

A fourth modified example of the blade of the above embodiment will be described with reference to FIG. 12.

A through-hole, forming a communication passage 75e of a blade 50e of this modified example is the same as that of the above embodiment. Specifically, this through-hole extends from the corner between the shaft-side surface 62 of the platform 60 and the outer surface 93 of the shaft-mounted part 90 through the corner between the shaft-side inner surface 88 and the end inner surface 89 of the inflow passage portion 82 to the blade passage 71. However, in this modified example, a bulge 77 that bulges in the blade thickness direction Dwt toward the inflow passage portion 82 is formed in the blade passage 71 inside the platform 60. The through-hole of this modified example extends through a region including the bulge 77.

Thus forming the bulge 77 in the blade passage 71 can shorten the distance between the blade passage 71 and the inflow passage portion 82 in the blade thickness direction Dwt. Accordingly, it is possible to further reduce the pressure loss of the cooling air Ac occurring in the process of the cooling air Ac flowing from the blade passage 71 into the platform passage 81.

Although this modified example is a modified example of the blade of the above embodiment, the blades of the first to third modified examples may be modified in the same manner as in this modified example.

Modified Example of Blade Manufacturing Method

A modified example of the blade manufacturing method of the above embodiment will be described with reference to FIG. 13 and FIG. 14.

Figure 6:
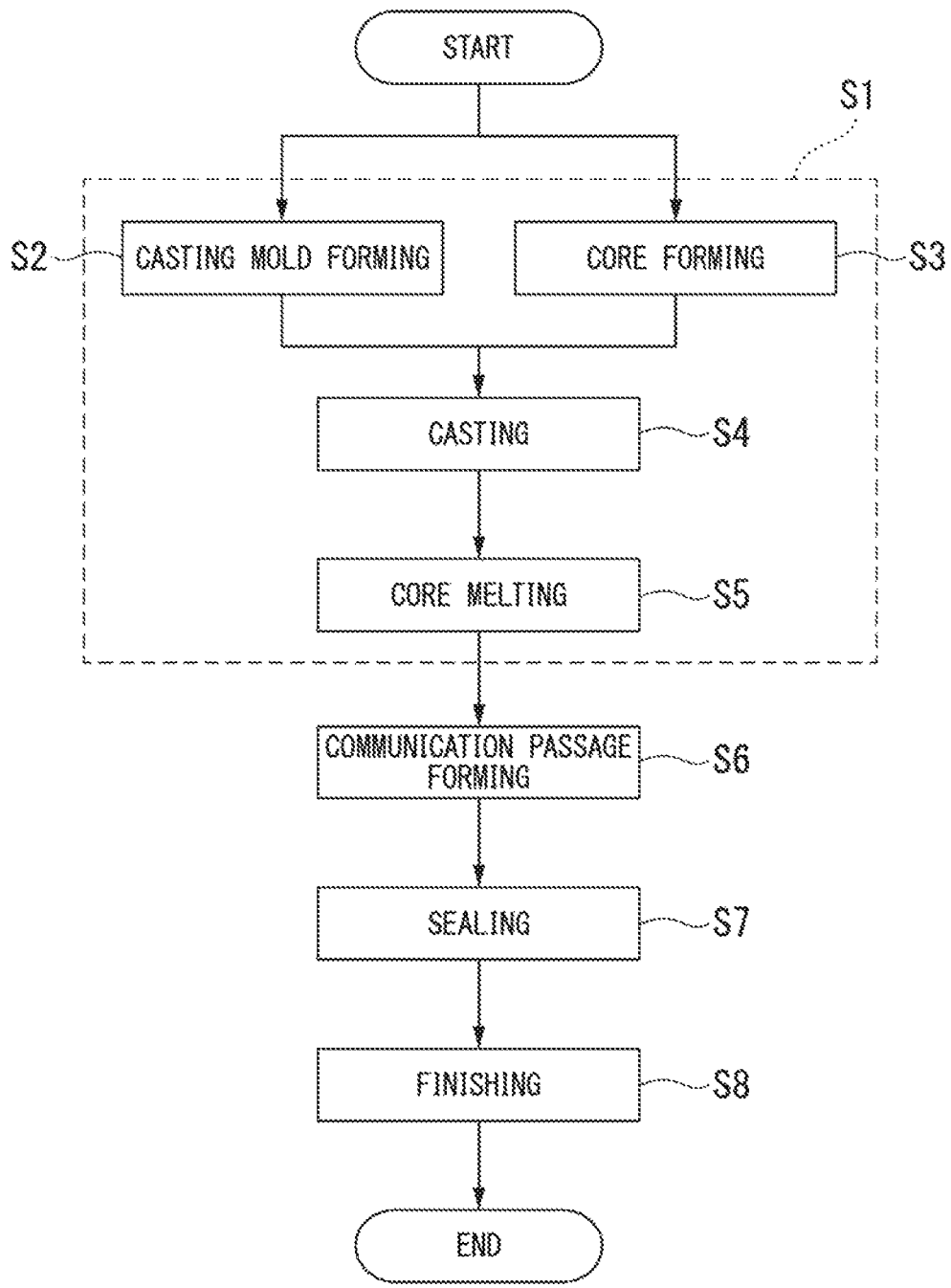
FIG. 6 is a flowchart showing a blade manufacturing procedure according to the embodiment of the present invention.

In this modified example, a part of the communication passage 75 is formed in the intermediate product forming step (S1) shown in FIG. 6. Specifically, as shown in FIG. 13, in the intermediate product forming step (S1), a pilot hole 79 is farmed that is recessed from the surface forming the corner between the shaft-side surface 62 of the platform 60 and the outer surface 93 of the shaft-mounted part 90 toward the inflow passage portion 82 of the platform passage 81 and the first blade passage 71a.

Figure 14:
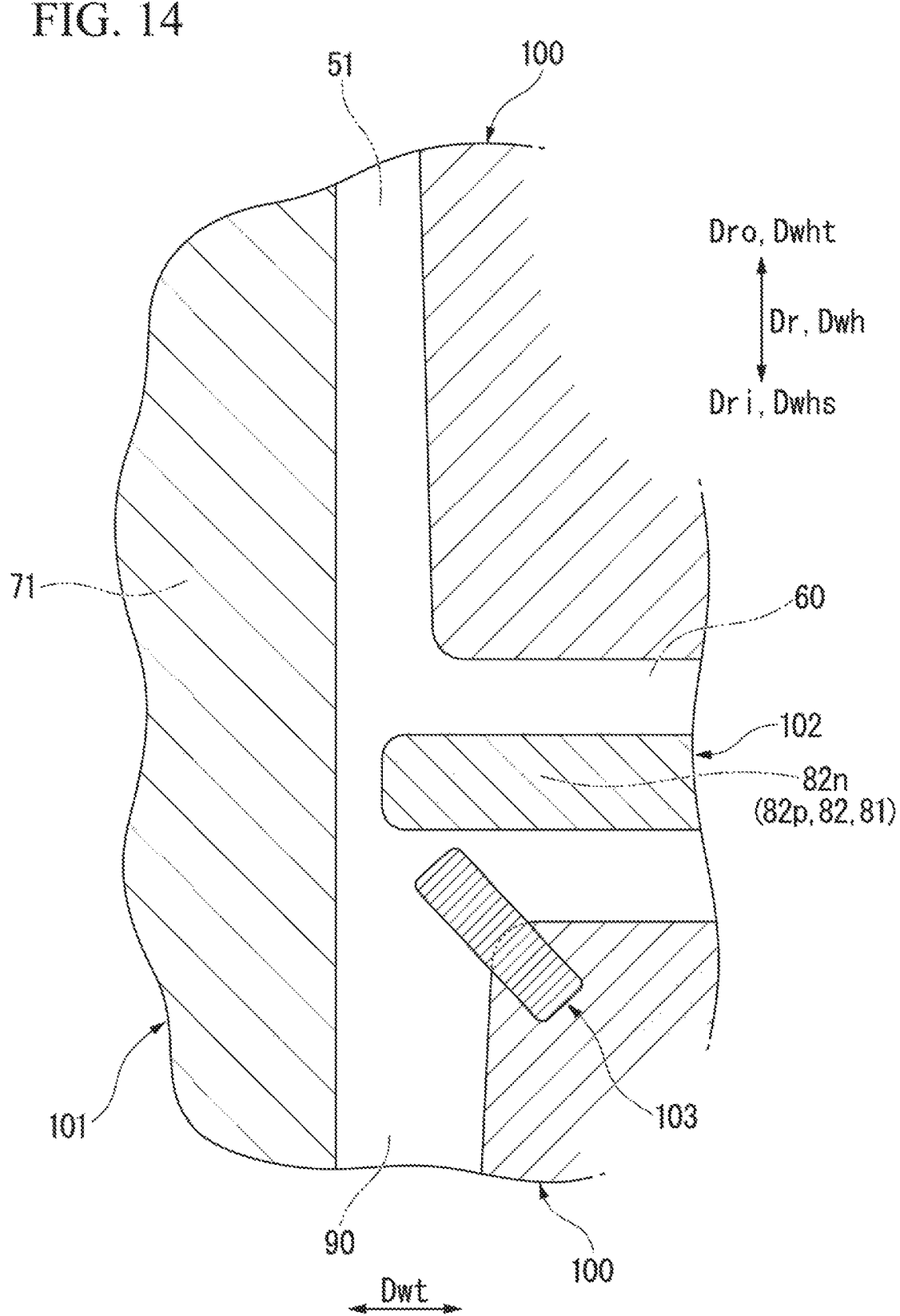
FIG. 14 is a view illustrating various cores used in the blade manufacturing process according to the modified example of the present invention.

In the intermediate product forming step (S1), to form the pilot hole 79, a pilot hole core 103 that has an external shape matching the shape of the pilot hole 79 is formed as shown in FIG. 14 in the core forming step (S3) of the intermediate product forming step (S1). As with the blade passage core 101 and the platform passage core 102, the pilot hole core 103 is made from ceramics, such as alumina. Next, in the casting step (S4) of the intermediate product forming step (S1), the pilot hole core 103 is disposed inside a casting mold 100 along with the blade passage core 101 and the platform passage core 102, and molten metal is poured into the casting mold 100. After the molten metal poured into the casting mold 100 has hardened, in the core melting step (S5), the ceramic blade passage core 101, platform passage core 102, and pilot hole core 103 are melted by an alkaline water solution.

Figure 13:
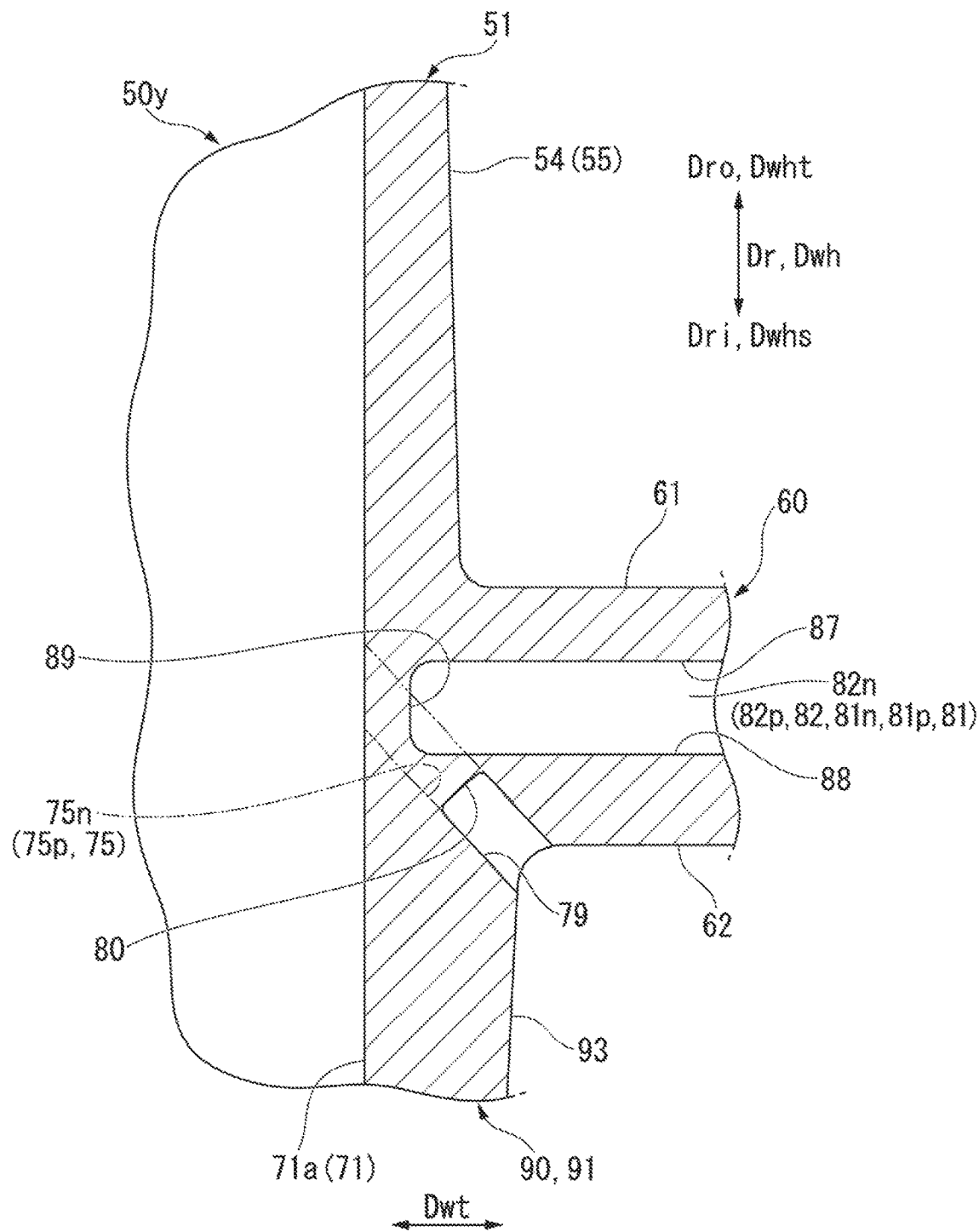
FIG. 13 is a sectional view of a main part of a blade intermediate product manufactured in a blade manufacturing process according to a modified example of the present invention.

This is the end of the intermediate product forming step (S1) in this modified example, and an intermediate product 50y shown in FIG. 13 is completed. The intermediate product 50y has the blade body 51, the platform 60, and the shaft-mounted part 90. In the intermediate product 50y, the blade passage 71, the platform passage 81, and the pilot hole 79 that forms a part of the communication passage 75 is formed.

In the communication passage forming step (S6) of this modified example, a through-hole that extends from a bottom surface 80 of the pilot hole 79 through the shaft-side inner surface 88 of the inflow passage portion 82 to the blade passage 71 is formed by electro-chemical machining, electric discharge machining, etc. In this modified example, the communication passage 75 shown in FIG. 5 is formed by the pilot hole 79 formed in the intermediate product forming step (S1) and the through-hole formed in the communication passage forming step by electro-chemical machining, electric discharge machining, etc.

When the communication passage forming step (86) is completed, the sealing step (S7) and the finishing step (S8) are performed to complete the blade as in the above embodiment.

In this modified example, the amount of machining of electro-chemical machining, electric discharge machining, etc. performed to form the through-hole can be reduced in the communication passage forming step (S6). Moreover, in this modified example, the pilot hole 79 formed in the intermediate product arming step (S1) can he used as a guide to perform electro-chemical machining or electric discharge machining, which can enhance the accuracy of the extension direction of the communication passage 75.

Although this modified example is a modified example of the blade manufacturing method of the above embodiment, the blades of the first to fourth modified examples may also be manufactured in the same manner as in this modified example.

Other Modified Examples

The cross-sectional shapes of the inflow passage portion 82 and the through-hole that forms the communication passage 75 have not been specifically described in the above embodiment and modified examples. These cross-sectional shapes are not limited to specific shapes, but may be, for example, circles, semicircles, ellipses, semi-ellipses, ovals, semiovals, polygons such as squares, or shapes combining two or more of these shapes.

All the communication passages in the above embodiment and modified examples are linear. However, these communication passages may be curved to some extent.

The inflow passage portion of the platform passage in the above embodiment and modified examples extends in the blade thickness direction. Accordingly, both the gas path-side inner surface and the shaft-side inner surface of the inflow passage portion in the above embodiment and modified examples spread in the blade thickness direction. However, the inflow passage should at least extend in a direction having more of a component of the blade thickness direction than a component of the blade height direction. Accordingly, the gas path-side inner surface and the shat side inner surface of the inflow passage portion should at least spread in a direction having more of a component of the blade thickness direction than a component of the blade height direction.

Industrial Applicability

According to an aspect of the present invention, it is possible to avoid the reduction of the strength and the cooling effect of the blade.

REFERENCE SIGNS LIST

10 Gas turbine
11 Gas turbine rotor
15 Gas turbine, casing
20 Compressor
21 Compressor rotor
25 Compressor easing
30 Combustor
40 Turbine
41 Turbine rotor
42 Rotor shaft
43 Blade row
45 Turbine casing
46 Vane row
46a Vane
49 Combustion gas flow passage
50, 50a, 50b, 50c, 501, 50e, 50z Blade
50x Intermediate product
51, 51a Blade body
52 Leading edge
53 Trailing edge
54 Suction-side surface
55 Pressure-side surface
60, 60a Platform
61 Gas path surface
62 Shaft-side surface
63 Lateral end surface
63n Suction-side end surface
63p Pressure-side end surface
64 Front-back end surface
64f Front end surface 64b Back end surface
71 Blade passage
71a First blade passage
71b Second blade passage
71c Third blade passage
75, 75a, 75b, 75c, 75d, 75e, 75z Communication passage
75h Suction-side communication passage
75p Pressure-side communication passage
76 Staling member
77 Bulge
78 Inner surface (of communication passage)
79 Pilot hole
81, 81a, 81z Platform passage
82, 82n, 82p Inflow passage
83n Lateral end passage portion
83p Meander passage portion
88 Shaft-side inner surface
90, 90a Shaft-mounted part
91 Shank
92 Blade root
100 Casting mold
101 Blade passage core
102 Platform passage core
103 Pilot hole core
Ac Cooling air
G Combustion gas
Da Axial direction
Dau Upstream side
Dad Downstream side
Dc Circumferential direction
Dr Radial direction
Dri Radially inner side
Dro Radially outer side
Dwc Chord direction
Dwf Chord front side
Dwb Chord back side
Dwh Blade height direction
Base end side
Dwht Leading end side
Dwp Width direction
Dpn Suction side
Dpp Pressure side
Dwt Blade thickness direction
Lca Camber line
Lco Chord

The invention claimed is:

1. A blade comprising:
a blade body that forms an airfoil and is disposed inside a combustion gas flow passage through which combustion gas flows;
a platform that spreads from an end in a blade height direction of the blade body in a direction having a component perpendicular to the blade height direction; and
a shaft-mounted part that extends from the platform toward the opposite side from the blade body, wherein
a blade passage through which cooling air flows is formed inside the blade body, the platform, and the shaft-mounted part so as to extend through the blade body, the platform, and the shaft-mounted part in the blade height direction,
the platform has a gas path surface that faces the blade height direction and comes in contact with the combustion gas, a shaft-side surface that is located back-to-back with the gas path surface, and a platform passage which is formed between the gas path surface and the shaft-side surface and through which cooling air flows,
the blade has a communication passage that leads from at least one surface of the shaft-side surface of the platform and an outer surface of the shaft-mounted part through the platform passage to the blade passage,
an opening of the communication passage in the at least one surface is blocked with a sealing member,
the platform passage has an inflow passage portion that extends from a position near the blade passage in a direction having a component of a blade thickness direction based on that position,
an inner surface defining the inflow passage portion includes a gas path-side inner surface that faces the shaft-side surface side, and a shaft-side inner surface that is the only surface of the inner surface facing the gas path-side inner surface and spreads in a direction having more of a component of the blade thickness direction than a component of the blade height direction, and
an inner surface defining the communication passage intersects with and joins to the shaft-side inner surface of the inflow passage portion.

2. The blade according to claim 1, wherein
the inner surface of the inflow passage portion includes an end inner surface that spreads from an end of the shaft-side inner surface on the blade passage side in a direction having a component of the blade height direction and joins to an end of the gas path-side inner surface on the blade passage side, and
the inner surface of the communication passage intersects with and joins to the end inner surface of the inflow passage portion.

3. The blade according to claim 1, wherein the inner surface of the communication passage intersects with and joins to the gas path-side inner surface of the inflow passage portion.

4. The blade according to claim 1, wherein
a bulge bulging in the blade thickness direction toward the inflow passage portion is formed in the blade passage, and
the communication passage intersects with and joins to the bulge of the blade passage.

5. The blade according to claim 1, wherein the platform passage has a meander passage portion that meanders inside the platform.

6. The blade according to claim 1, wherein
the platform has a lateral end surface that spreads in a direction having a component perpendicular to a width direction and joins to the gas path surface, the width direction having a component perpendicular to a chord direction of the blade body and the blade height direction, and
the platform passage has a lateral end passage portion that extends along the lateral end surface in a direction having a component of the chord direction.

7. A gas turbine comprising:
a plurality of the blades according to claim 1;
a rotor shaft on which the plurality of blades are mounted;
a casing that covers the plurality of blades and the rotor shaft; and
a combustor that sends combustion gas to a region inside the casing where the plurality of blades are disposed.

8. A blade manufacturing method comprising:
an intermediate product forming step of forming an intermediate product of a blade having a blade body that forms an airfoil and is disposed inside a combustion gas flow passage through which combustion gas flows, a platform that spreads from an end in a blade height direction of the blade body in a direction having a component perpendicular to the blade height direction, and a shaft-mounted part that extends from the platform toward the opposite side from the blade body;

a communication passage forming step of forming a communication passage that extends from an outer surface of the intermediate product to an inside of the intermediate product; and a sealing step of blocking an opening of the communication passage in the outer surface of the intermediate product, wherein in the intermediate product forming step,
- a blade passage through which cooling air flows is formed inside the blade body, the platform, and the shaft-mounted part so as to extend in the blade height direction;
- a gas path surface that faces the blade height direction and comes in contact with the combustion gas, a shaft-side surface that is located back-to-back with the gas path surface, and a platform passage which is formed between the gas path surface and the shaft-side surface and through which cooling air flows are formed in the platform;
- an inflow passage portion that extends from a position near the blade passage in a direction having a component of a blade thickness direction based on that position is formed as a portion of the platform passage; and
- as a part of an inner surface defining the inflow passage portion, a gas path-side inner surface that faces the shaft-side surface side, and a shaft-side inner surface that is the only surface of the inner surface facing the gas path-side inner surface and spreads in a direction having more of a component of the blade thickness direction than a component of the blade height direction, are formed when the inflow passage portion is formed, and in the communication passage forming step, a through-hole that extends from at least one surface of the shaft-side surface of the platform and an outer surface of the shaft-mounted part through the shaft-side inner surface of the inflow passage portion to the blade passage is formed as the communication passage.

9. The blade manufacturing method according to claim 8, wherein in the intermediate product forming step, an end inner surface that spreads from an end of the shaft-side inner surface on the blade passage side in a direction having a component of the blade height direction and joins to an end of the gas path-side inner surface on the blade passage side is formed as a part of the inner surface defining the inflow passage portion, and in the communication passage forming step, a through-hole that extends to the blade passage through the end inner surface of the inflow passage portion is formed as the communication passage.

10. The blade manufacturing method according to claim 8, wherein, in the communication passage forming step, a through-hole that extends to the blade passage through a corner between the shaft-side inner surface and the end inner surface of the inflow passage portion is formed as the communication passage.

11. The blade manufacturing method according to claim 8, wherein, in the communication passage forming step, a through-hole that extends to the blade passage through the gas path-side inner surface of the inflow passage portion is formed as the communication passage.

12. The blade manufacturing method according to claim 8, wherein, in the communication passage forming step, a through-hole that extends to the blade passage through a corner between the gas path-side inner surface and the end inner surface of the inflow passage portion is formed as the communication passage.

13. The blade manufacturing method according to claim 8, wherein the intermediate product forming step includes:
- a casting mold forming step of forming a casting mold that has an internal space matching an external shape of the blade;
- a core forming step of forming a blade passage core that has an external shape matching a shape of the blade passage, and a platform passage core that has an external shape matching a shape of the platform passage;
- a casting step of disposing the blade passage core and the platform passage core inside the casting mold, and pouring molten metal into the casting mold; and
- a core melting step of melting the blade passage core and the platform passage core after the molten metal has hardened.

14. The blade manufacturing method according to claim 8, wherein in the intermediate product forming step, a pilot hole is formed that is recessed from at least one surface of the shaft-side surface of the platform and an outer surface of the shaft-mounted part toward the shaft-side inner surface of the inflow passage portion, and in the communication passage forming step, a through-hole is formed that extends from a bottom surface of the pilot hole of the intermediate product, formed in the intermediate product forming step, through the shaft-side inner surface of the inflow passage portion to the blade passage.

15. The blade manufacturing method according to claim 14, wherein in the core forming step, a pilot hole core that has an external shape matching a shape of the pilot hole is formed, in the casting step, the pilot hole core is disposed inside the casting mold and molten metal is poured into the casting mold, and in the core melting step, the pilot hole core is melted after the molten metal has hardened.

16. The blade manufacturing method according to claim 8, wherein, in the communication passage forming step, the through-hole is formed by electric discharge machining or electro-chemical machining.

* * * * *